US012417748B2

(12) United States Patent
Moon et al.

(10) Patent No.: US 12,417,748 B2
(45) Date of Patent: Sep. 16, 2025

(54) DISPLAY DEVICE, METHOD OF CONTROLLING LUMINANCE OF DISPLAY DEVICE AND ELECTRONIC DEVICE

(71) Applicant: Samsung Display Co., LTD., Yongin-si (KR)

(72) Inventors: Daye Moon, Yongin-si (KR); Jongha Shin, Yongin-si (KR); Kitae Yoon, Yongin-si (KR); Kyoungho Lim, Yongin-si (KR); Wonwoo Jang, Yongin-si (KR); Yooshin Chon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/420,220

(22) Filed: Jan. 23, 2024

(65) Prior Publication Data

US 2024/0379068 A1 Nov. 14, 2024

(30) Foreign Application Priority Data

May 11, 2023 (KR) ........................ 10-2023-0061080

(51) Int. Cl.

*G09G 3/20* (2006.01)
*G09G 3/3266* (2016.01)
*G09G 3/3291* (2016.01)

(52) U.S. Cl.

CPC ......... *G09G 3/3291* (2013.01); *G09G 3/3266* (2013.01); *G09G 2320/0257* (2013.01); *G09G 2320/046* (2013.01); *G09G 2320/0626* (2013.01); *G09G 2330/021* (2013.01)

(58) Field of Classification Search

None

See application file for complete search history.

(56) References Cited

U.S. PATENT DOCUMENTS

| | | | | |
|---|---|---|---|---|
| 2010/0134535 | A1 | 6/2010 | Shidara et al. | |
| 2012/0206385 | A1* | 8/2012 | Seo | G06F 21/83 345/173 |
| 2019/0139478 | A1 | 5/2019 | Jang | |
| 2021/0201726 | A1 | 7/2021 | Kim | |
| 2021/0390898 | A1* | 12/2021 | Roh | G09G 3/2003 |
| 2022/0165200 | A1 | 5/2022 | Park et al. | |

FOREIGN PATENT DOCUMENTS

KR 100521467 B1 10/2005

OTHER PUBLICATIONS

Extended European Search Report dated Jul. 3, 2024 issued in corresponding European Patent Application No. 24156455.8.

* cited by examiner

*Primary Examiner* — Carl Adams

(74) *Attorney, Agent, or Firm* — CANTOR COLBURN LLP

(57) ABSTRACT

A display device includes: a display panel including a plurality of pixels, and a panel driver configured to drive the display panel based on input image data. The panel driver determines whether a fixed image is displayed in an outermost region of the display panel based on the input image data, and decreases a luminance of the outermost region when that the fixed image is displayed in the outermost region is determined.

31 Claims, 25 Drawing Sheets

FIG. 5

| | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| R1 | BL1 | BL19 | BL37 | BL55 | BL73 | BL91 | BL109 | BL127 | BL145 | BL163 | BL181 | BL199 | BL217 | BL235 | BL253 | BL271 |
| R2 | BL2 | BL20 | BL38 | BL56 | BL74 | BL92 | BL110 | BL128 | BL146 | BL164 | BL182 | BL200 | BL218 | BL236 | BL254 | BL272 |
| R3 | BL3 | BL21 | BL39 | BL57 | BL75 | BL93 | BL111 | BL129 | BL147 | BL165 | BL183 | BL201 | BL219 | BL237 | BL255 | BL273 |
| R4 | BL4 | BL22 | BL40 | BL58 | BL76 | BL94 | BL112 | BL130 | BL148 | BL166 | BL184 | BL202 | BL220 | BL238 | BL256 | BL274 |
| R5 | BL5 | BL23 | BL41 | BL59 | BL77 | BL95 | BL113 | BL131 | BL149 | BL167 | BL185 | BL203 | BL221 | BL239 | BL257 | BL275 |
| R6 | BL6 | BL24 | BL42 | BL60 | BL78 | BL96 | BL114 | BL132 | BL150 | BL168 | BL186 | BL204 | BL222 | BL240 | BL258 | BL276 |
| R7 | BL7 | BL25 | BL43 | BL61 | BL79 | BL97 | BL115 | BL133 | BL151 | BL169 | BL187 | BL205 | BL223 | BL241 | BL259 | BL277 |
| R8 | BL8 | BL26 | BL44 | BL62 | BL80 | BL98 | BL116 | BL134 | BL152 | BL170 | BL188 | BL206 | BL224 | BL242 | BL260 | BL278 |
| R9 | BL9 | BL27 | BL45 | BL63 | BL81 | BL99 | BL117 | BL135 | BL153 | BL171 | BL189 | BL207 | BL225 | BL243 | BL261 | BL279 |
| R10 | BL10 | BL28 | BL46 | BL64 | BL82 | BL100 | BL118 | BL136 | BL154 | BL172 | BL190 | BL208 | BL226 | BL244 | BL262 | BL280 |
| R11 | BL11 | BL29 | BL47 | BL65 | BL83 | BL101 | BL119 | BL137 | BL155 | BL173 | BL191 | BL209 | BL227 | BL245 | BL263 | BL281 |
| R12 | BL12 | BL30 | BL48 | BL66 | BL84 | BL102 | BL120 | BL138 | BL156 | BL174 | BL192 | BL210 | BL228 | BL246 | BL264 | BL282 |
| R13 | BL13 | BL31 | BL49 | BL67 | BL85 | BL103 | BL121 | BL139 | BL157 | BL175 | BL193 | BL211 | BL229 | BL247 | BL265 | BL283 |
| R14 | BL14 | BL32 | BL50 | BL68 | BL86 | BL104 | BL122 | BL140 | BL158 | BL176 | BL194 | BL212 | BL230 | BL248 | BL266 | BL284 |
| R15 | BL15 | BL33 | BL51 | BL69 | BL87 | BL105 | BL123 | BL141 | BL159 | BL177 | BL195 | BL213 | BL231 | BL249 | BL267 | BL285 |
| R16 | BL16 | BL34 | BL52 | BL70 | BL88 | BL106 | BL124 | BL142 | BL160 | BL178 | BL196 | BL214 | BL232 | BL250 | BL268 | BL286 |
| R17 | BL17 | BL35 | BL53 | BL71 | BL89 | BL107 | BL125 | BL143 | BL161 | BL179 | BL197 | BL215 | BL233 | BL251 | BL269 | BL287 |
| R18 | BL18 | BL36 | BL54 | BL72 | BL90 | BL108 | BL126 | BL144 | BL162 | BL180 | BL198 | BL216 | BL234 | BL252 | BL270 | BL288 |

DISPLAY DEVICE, METHOD OF CONTROLLING LUMINANCE OF DISPLAY DEVICE AND ELECTRONIC DEVICE

This application claims priority to Korean Patent Application No. 10-2023-0061080, filed on May 11, 2023, and all the benefits accruing therefrom under 35 U.S.C. § 119, the content of which in its entirety is herein incorporated by reference.

BACKGROUND

1. Field

Embodiments of the present invention relate to a display device, and more particularly to a display device that performs luminance control, a method of controlling luminance of the display device, and an electronic device including the display device.

2. Description of the Related Art

With the development of information technologies, the importance of a display device that is a connection medium between a user and information has increased. Accordingly, display devices such as liquid crystal display devices, organic light emitting display devices, and plasma display panels are increasingly used. Among these display devices, an organic light emitting display device displays images using an organic light emitting diode that generates light by recombination of electrons and holes. The organic light emitting display device has a relatively high response speed and are driven with relatively low power consumption.

However, when the organic light emitting display device displays a fixed image for a long time, afterimages (or mura) may be perceived in an image displayed by the organic light emitting display device due to burn-in of organic light emitting diodes included in the organic light emitting display device. In particular, in the organic light emitting display device such as a monitor, a fixed image (e.g., a task bar image) may be continuously displayed in an outermost region of a display panel, and thus the afterimages may be likely to occur in the outermost region.

SUMMARY

Some embodiments provide a display device capable of preventing or delaying an afterimage from occurring in an outermost region.

Some embodiments provide a method of controlling a luminance of a display device capable of preventing or delaying an afterimage from occurring in an outermost region.

Some embodiments provide an electronic device including a display device capable of preventing or delaying an afterimage from occurring in an outermost region.

According to embodiments, there is provided a display device including a display panel including a plurality of pixels, and a panel driver configured to drive the display panel based on input image data. The panel driver determines whether a fixed image is displayed in an outermost region of the display panel based on the input image data, and decreases a luminance of the outermost region when that the fixed image is displayed in the outermost region is determined.

In embodiments, the outermost region may include at least one of a lowermost region and an uppermost region of the display panel.

In embodiments, the fixed image may include at least one of a task bar image and a menu image.

In embodiments, the panel driver may determine that the fixed image is displayed in the outermost region when a difference between the luminance of the outermost region and a luminance of an adjacent region adjacent to the outermost region is greater than or equal to a first reference difference, and a difference between the luminance of the outermost region in a first frame and the luminance of the outermost region in a second frame different from the first frame is less than or equal to a second reference difference.

In embodiments, the panel driver may include a block luminance decider configured to divide the display panel into a plurality of blocks, and to decide a plurality of luminance values for the plurality of blocks, respectively, based on the input image data, a first luminance difference calculator configured to calculate, with respect to each of outermost blocks located in the outermost region among the plurality of blocks, a first difference value between a luminance value of each of the outermost blocks and a luminance value of an adjacent block adjacent to each of the outermost blocks, a second luminance difference calculator configured to calculate, with respect to each of the outermost blocks, a second difference value between the luminance value of each of the outermost blocks in a first frame and the luminance value of each of the outermost blocks in a second frame different from the first frame, and a fixed image determiner configured to determine whether the fixed image is displayed in the outermost region based on the first difference value and the second difference value of each of the outermost blocks.

In embodiments, the block luminance decider may convert a plurality of gray levels represented by the input image data for the plurality of pixels included in each of the plurality of blocks into a plurality of pixel luminance values, and may decide an average of the plurality of pixel luminance values of each of the plurality of blocks as the luminance value of each of the plurality of blocks.

In embodiments, the outermost blocks may be arranged continuously along a first direction, and the adjacent block may be adjacent to each of the outermost blocks in a second direction substantially perpendicular to the first direction.

In embodiments, the first frame may be a current frame, and the second frame may be an immediately previous frame.

In embodiments, the first frame may be a current frame, and the second frame may be a previous frame apart from the current frame by an interval of at least one frame therebetween.

In embodiments, the fixed image determiner may determine that the fixed image is displayed in the outermost region when the first difference value is greater than or equal to a first reference difference value, and a total number of the outermost blocks of which the second difference value is less than or equal to a second reference difference value is greater than or equal to a reference number.

In embodiments, the fixed image determiner may increase, in each frame, a step value of each of the outermost blocks of which the first difference value is greater than or equal to the first reference difference value and the second difference value is less than or equal to the second reference difference value, may decrease, in each frame, the step value of each of the outermost blocks of which the first difference value is less than the first reference difference value or the second difference value is greater than the second reference difference value, may count a total number of the outermost blocks of which the step value is a maximum step value, and may determine that the fixed image is displayed in the outermost region when the counted total number is greater than or equal to a reference number.

In embodiments, the panel driver may include a luminance controller configured to decrease the luminance of the outermost region when that the fixed image is displayed in the outermost region is determined.

In embodiments, the luminance controller may gradually decrease a luminance of an adjacent region adjacent to the outermost region and the luminance of the outermost region.

In embodiments, the luminance controller may decrease a luminance of an adjacent region adjacent to the outermost region with a first luminance decrease rate by adjusting the luminance of the adjacent region to a value of the first luminance decrease rate times the luminance of the adjacent region, and may decrease the luminance of the outermost region with a second luminance decrease rate lower than the first luminance decrease rate by adjusting the luminance of the outermost region to a value of the second luminance decrease rate times the luminance of the outermost region.

In embodiments, the luminance controller may receive a luminance control option signal representing a first luminance decrease rate and a second luminance decrease rate from an external host processor, may decrease a luminance of an adjacent region adjacent to the outermost region with the first luminance decrease rate, and may decrease the luminance of the outermost region with the second luminance decrease.

In embodiments, the panel driver may include a luminance controller configured to perform a global luminance control operation to control a luminance of an entire region of the display panel, and to perform an outermost region luminance control operation to decrease the luminance of the outermost region displaying the fixed image.

In embodiments, to perform the global luminance control operation, the luminance controller may gradually decrease luminances of the plurality of pixels according to a distance from a center region of the display panel to each of the plurality of pixels.

In embodiments, with respect to each of the plurality of pixels in the outermost region, the luminance controller may calculate a final luminance decrease rate by multiplying a global luminance decrease rate for the global luminance control operation and a luminance decrease rate for the outermost region luminance control operation, and may decrease a luminance of each of the plurality of pixels in the outermost region with the final luminance decrease rate.

In embodiments, when that the fixed image is not displayed in the outermost region is determined, the luminance controller may perform the global luminance control operation with a first global luminance decrease rate. When that the fixed image is displayed in the outermost region is determined, the luminance controller may perform the global luminance control operation with a second global luminance decrease rate lower than the first global luminance decrease rate, and may further perform the outermost region luminance control operation.

According to embodiments, there is provided a display device including a display panel including a plurality of pixels, and a panel driver configured to drive the display panel based on input image data. The panel driver includes a block luminance decider configured to divide the display panel into a plurality of blocks, and to decide a plurality of luminance values for the plurality of blocks, respectively, based on the input image data, a first luminance difference calculator configured to calculate, with respect to each of outermost blocks located in an outermost region of the display panel among the plurality of blocks, a first difference value between a luminance value of each of the outermost blocks and a luminance value of an adjacent block adjacent to each of the outermost blocks, a second luminance difference calculator configured to calculate, with respect to each of the outermost blocks, a second difference value between the luminance value of each of the outermost blocks in a first frame and the luminance value of each of the outermost blocks in a second frame different from the first frame, a fixed image determiner configured to determine whether a fixed image is displayed in the outermost region based on the first difference value and the second difference value of each of the outermost blocks, and a luminance controller configured to decrease a luminance of the outermost region when that the fixed image is displayed in the outermost region is determined.

In embodiments, the luminance controller may perform a global luminance control operation that controls a luminance of an entire region of the display panel along with an outermost region luminance control operation that decreases the luminance of the outermost region displaying the fixed image.

According to embodiments, there is provided a method of controlling a luminance of a display device. In the method, a display panel of the display device is divided into a plurality of blocks, and a plurality of luminance values for the plurality of blocks, respectively, are decided based on input image data. With respect to each of outermost blocks located in an outermost region of the display panel among the plurality of blocks, a first difference value between a luminance value of each of the outermost blocks and a luminance value of an adjacent block adjacent to each of the outermost blocks may be calculated. With respect to each of the outermost blocks, a second difference value between the luminance value of each of the outermost blocks in a first frame and the luminance value of each of the outermost blocks in a second frame different from the first frame may be calculated. It may be determined whether a fixed image is displayed in the outermost region based on the first difference value and the second difference value of each of the outermost blocks. A luminance of the outermost region may be decreased when it is determined that the fixed image is displayed in the outermost region.

In embodiments, a luminance control option signal representing a first luminance decrease rate and a second luminance decrease rate may be received from an external host processor. A luminance of an adjacent region adjacent to the outermost region may be decreased with the first luminance decrease rate, and the luminance of the outermost region may be decreased with the second luminance decrease.

In embodiments, a global luminance control operation may be performed to control a luminance of an entire region of the display panel.

In embodiments, the global luminance control operation may be performed with a first global luminance decrease rate when that the fixed image is not displayed in the outermost region is determined, and the global luminance control operation may be performed with a second global luminance decrease rate lower than the first global luminance decrease rate when that the fixed image is displayed in the outermost region is determined.

According to embodiments, there is provided a display device including: a display panel including a plurality of pixels, and a panel driver configured to drive the display panel based on input image data. With respect to the same gray level of the input image data, the panel driver sets a luminance of an outermost image of the display panel when a task bar image is displayed in the outermost region lower than the luminance of the outermost image when the task bar image is not displayed in the outermost region.

According to embodiments, there is provided an electronic device including a processor configured to provide image data, a display panel including a plurality of pixels, a data driver configured to provide data voltages to the plurality of pixels, a gate driver configured to provide gate signals to the plurality of pixels, and a controller configured to receive the image data from the processor, and to control the data driver and the gate driver. The controller determines whether a fixed image is displayed in an outermost region of the display panel based on the image data, and decreases a luminance of the outermost region when that the fixed image is displayed in the outermost region is determined.

In embodiments, the controller may determine that the fixed image is displayed in the outermost region when a difference between the luminance of the outermost region and a luminance of an adjacent region adjacent to the outermost region is greater than or equal to a first reference difference, and a difference between the luminance of the outermost region in a first frame and the luminance of the outermost region in a second frame different from the first frame is less than or equal to a second reference difference.

In embodiments, the controller may include a block luminance decider configured to divide the display panel into a plurality of blocks, and to decide a plurality of luminance values for the plurality of blocks, respectively, based on the image data, a first luminance difference calculator configured to calculate, with respect to each of outermost blocks located in the outermost region among the plurality of blocks, a first difference value between a luminance value of each of the outermost blocks and a luminance value of an adjacent block adjacent to each of the outermost blocks, a second luminance difference calculator configured to calculate, with respect to each of the outermost blocks, a second difference value between the luminance value of each of the outermost blocks in a first frame and the luminance value of each of the outermost blocks in a second frame different from the first frame, a fixed image determiner configured to determine whether the fixed image is displayed in the outermost region based on the first difference value and the second difference value of each of the outermost blocks, and a luminance controller configured to decrease the luminance of the outermost region when that the fixed image is displayed in the outermost region is determined.

In embodiments, the controller may receive a luminance control option signal representing a first luminance decrease rate and a second luminance decrease rate from the processor. The luminance controller may decrease a luminance of an adjacent region adjacent to the outermost region with the first luminance decrease rate, and may decrease the luminance of the outermost region with the second luminance decrease.

In embodiments, the luminance controller may perform a global luminance control operation that controls a luminance of an entire region of the display panel along with an outermost region luminance control operation that decreases the luminance of the outermost region displaying the fixed image.

As described above, in a display device, a method of controlling a luminance of the display device, and an electronic device according to embodiments, it may be determined whether a fixed image is displayed in an outermost region of a display panel. If it is determined that the fixed image is displayed in the outermost region, a luminance of the outermost region may be decreased. Accordingly, an afterimage (or mura) may be effectively prevented or delayed from occurring in the outermost region, and the life of the display device may be effectively extended.

BRIEF DESCRIPTION OF THE DRAWINGS

Illustrative, non-limiting embodiments will be more clearly understood from the following detailed description in conjunction with the accompanying drawings.

FIG. 5 is a diagram illustrating an example where a display panel of a display device is divided into a plurality of blocks according to embodiments.

DETAILED DESCRIPTION OF THE EMBODIMENTS

Figure 1:
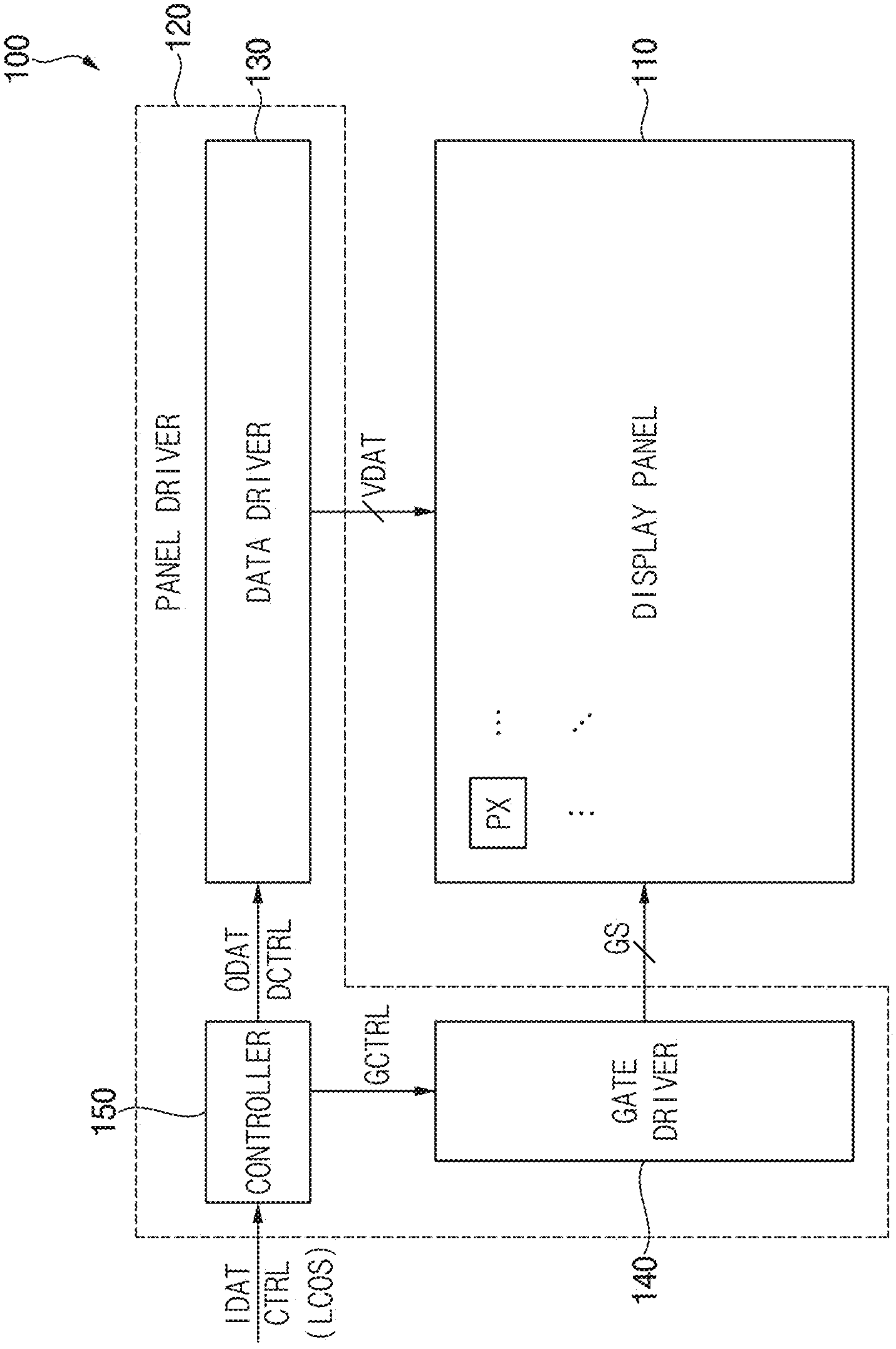
FIG. 1 is a block diagram illustrating a display device according to embodiments.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About", "approximately" or "substantially perpendicular" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, ""substantially perpendicular" can mean within one or more standard deviations, or within +20%, 10% or 5% of the stated value (perfectly perpendicular).

Hereinafter, embodiments of the present invention will be explained in detail with reference to the accompanying drawings. The same reference numerals are used for the same components in the drawings, and duplicate descriptions of the same components are omitted.

Figure 2:
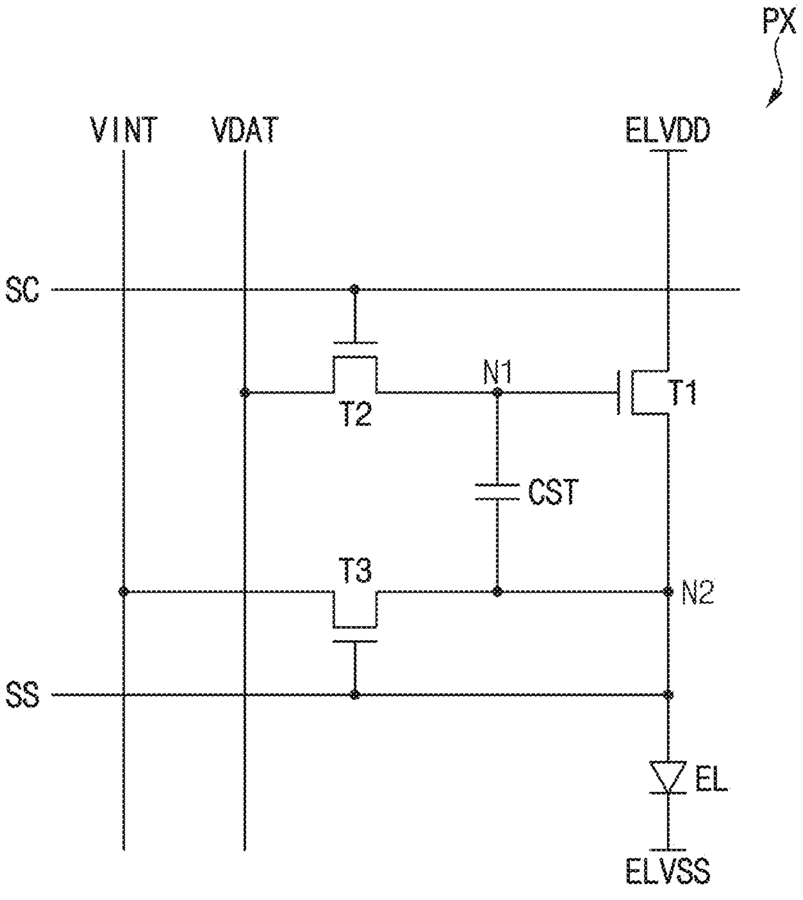
FIG. 2 is a circuit diagram illustrating an example of a pixel included in a display device according to embodiments.
Figure 3:
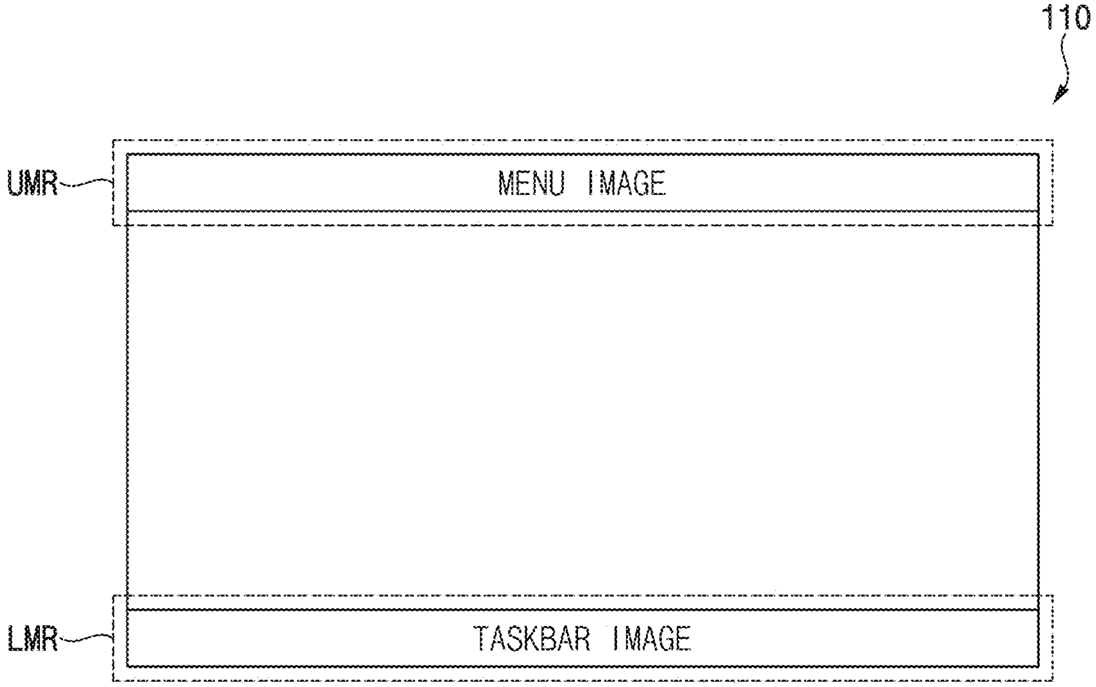
FIG. 3 is a diagram illustrating an example of an image displayed in a display panel of a display device according to embodiments.

FIG. 1 is a block diagram illustrating a display device according to embodiments, FIG. 2 is a circuit diagram illustrating an example of a pixel included in a display device according to embodiments, and FIG. 3 is a diagram illustrating an example of an image displayed in a display panel of a display device according to embodiments.

Referring to FIG. 1, a display device 100 according to embodiments may include a display panel 110 that includes a plurality of pixels PX, and a panel driver 120 that drives the display panel 110 based on input image data IDAT. In some embodiments, the panel driver 120 may include a data driver 130 that provides data voltages VDAT to the plurality of pixels PX, a gate driver 140 that provides gate signals GS to the plurality of pixels PX, and a controller 150 that controls the data driver 130 and the gate driver 140.

The display panel 110 may include a plurality of data lines, a plurality of gate lines, and the plurality of pixels PX connected thereto. In some embodiments, each pixel PX may receive a scan signal SC and a sensing signal SS as the gate signal GS, and may include a first transistor T1, a second transistor T2, and a third transistor T3, a storage capacitor CST, and a light emitting element EL.

The first transistor T1 may include a gate connected to a first node N1, a first terminal receiving a first power supply voltage ELVDD (e.g., a high power supply voltage), and a second terminal connected to a second node N2. The first transistor T1 may generate a driving current based on a voltage between the first node N1 and the second node N2. The first transistor T1 may be referred to as a driving transistor.

The second transistor T2 may include a gate receiving the scan signal SC, a first terminal receiving the data voltage VDAT, and a second terminal connected to the first node N1. The second transistor T2 may provide the data voltage VDAT to the first node N1 in response to the scan signal SC. The second transistor T2 may be called a switching transistor or a writing transistor.

The third transistor T3 may include a gate receiving the sensing signal SS, a first terminal receiving an initialization voltage VINT, and a second terminal connected to the second node N2. The third transistor T3 may provide the initialization voltage VINT to the second node N2 in response to the sensing signal SS. The third transistor T3 may be referred to as an initialization transistor or a sensing transistor.

Although FIG. 2 illustrates an embodiment in which the first transistor T1, the second transistor T2 and the third transistor T3 are n-type transistors (for example, NMOS transistors), but types of the first, second and third transistors T1, T2 and T3 are not limited thereto. In other embodiments, at least one of the first transistor T1, the second transistor T2, and the third transistor T3 may be a p-type transistor (e.g., a PMOS transistor).

The storage capacitor CST may include a first electrode connected to the first node N1 and a second electrode connected to the second node N2. The storage capacitor CST may store the voltage between the first node N1 and the second node N2.

The light emitting element EL may include a first electrode (or an anode) connected to the second node N2 and a second electrode (or a cathode) receiving a second power supply voltage ELVSS (e.g., a low power supply voltage). The light emitting element EL may emit light based on the driving current provided from the first transistor T1. In an embodiment, for example, the light emitting element EL may be an organic light emitting diode ("OLED"), and the display panel 110 may be an OLED display panel. In other examples, the light emitting element EL may be a nano light emitting diode ("NED"), a quantum dot ("QD") light emitting diode, a micro light emitting diode, an inorganic light emitting diode, or any other suitable light emitting element.

Although FIG. 2 illustrates an embodiment in which the pixel PX includes three transistors and one capacitor, but the pixel PX according to embodiments is not limited thereto. In other embodiments, the pixel PX may include two, four, or more transistors and/or two or more capacitors.

The data driver 130 may generate the data voltages VDAT based on a data control signal DCTRL and output image data ODAT received from the controller 150, and may provide the data voltages VDAT to the plurality of pixels PX through the data lines. In some embodiments, the data control signal DCTRL may include, but is not limited to, an output data enable signal, a horizontal start signal, and a load signal. In some embodiments, the data driver 130 and the controller 150 may be implemented as a single integrated circuit, and such integrated circuit may be referred to as a timing controller embedded data driver ("TED"). In other embodiments, the data driver 130 and controller 150 may be implemented as separate integrated circuits.

The gate driver 140 may generate the gate signals GS based on a gate control signal GCTRL received from the controller 150, and provide the gate signals GS to the plurality of pixels PX through the scan lines. In some embodiments, the gate control signal GCTRL may include, but is not limited to, a start signal, a clock signal, etc. Further, in some embodiments, the gate signal GS may include, but is not limited to, the scan signal SC and the sensing signal SS illustrated in FIG. 2. Further, in some embodiments, the gate driver 140 may be integrated or formed in the display panel 110. In other embodiments, the gate driver 140 may be implemented as one or more integrated circuits.

The controller 150 (e.g., a timing controller ("T-CON")) may receive input image data IDAT and a control signal CTRL from an external host processor (e.g., a graphics processing unit ("GPU"), an application processor ("AP") or a graphics processing unit (GPU). The control signal CTRL may include, but is not limited to, a vertical synchronization signal, a horizontal synchronization signal, an input data enable signal, and a master clock signal. In some embodiments, the control signal CTRL may further include a luminance control option signal ("LCOS") that enables or disables an outermost region luminance control operation for controlling a luminance of an outermost region (e.g., an uppermost region and/or a lowermost region) of the display panel 110, or that determines a luminance decrease rate used in the outermost region luminance control operation. The controller 150 may generate the output image data ODAT, the data control signal DCTRL and the gate control signal GCTRL based on the input image data IDAT and the control signal CTRL. The controller 150 may control the data driver 130 by providing the output image data ODAT and the data control signal DCTRL to the data driver 130, and may control the gate driver 140 by providing the gate control signal GCTRL to the gate driver 140.

In the display device 100 according to embodiments, the panel driver 120 (or the controller 150 of the panel driver 120) may determine whether a fixed image is displayed in the outermost region of the display panel 110 based on the input image data IDAT, and may perform the outermost region luminance control operation that decreases the luminance of the outermost region when it is determined that the fixed image is displayed in the outermost region. Here, the fixed image may mean an image with no (or almost no) change in luminance over a plurality of frames. In some embodiments, the panel driver 120 determines that the fixed image is displayed in the outermost region when a difference between the luminance of the outermost region and a luminance of an adjacent region adjacent to the outermost region is greater than or equal to a first reference difference, and a difference between the luminance of the outermost region in a first frame and the luminance of the outermost region in a second frame different from the first frame is less than or equal to a second reference difference.

In some embodiments, the outermost region may include at least one of the lowermost region and the uppermost region of the display panel 110, and the fixed image may include at least one of a task bar image and a menu image. In an embodiment, for example, as illustrated in FIG. 3, the fixed image displayed in the outermost region may be the task bar image displayed in the lowermost region LMR of the display panel 110, and/or the menu image displayed in the uppermost region UMR of the display panel 110.

When a display device displays a fixed image for a long time, an afterimage (or mura) may be perceived in an image displayed by the display device due to burn-in of a light emitting element (e.g., an OLED). In particular, when the display device is a monitor, a task bar image may be continuously displayed in the lowermost region LMR of a display panel, and a menu image of a specific program (e.g., an office program) may be continuously displayed in the uppermost region UMR of the display panel. Thus, pixels in the lowermost region LMR and/or the uppermost region UMR may deteriorate within a short time, and the afterimage may occur in the lowermost region and/or the uppermost region.

However, in the display device 100 according to embodiments, the panel driver 120 may determine whether the fixed image is displayed in the outermost region (e.g., the lowermost region LMR and/or the uppermost region UMR), and may decrease the luminance of the outermost region displaying the fixed image. Accordingly, the deterioration of the pixels PX in the outermost region may be prevented or delayed, and an occurrence of the afterimage (or mura) in the outermost region may be effectively prevented or delayed, and the life of the display device 100 may be effectively extended.

Figure 4:
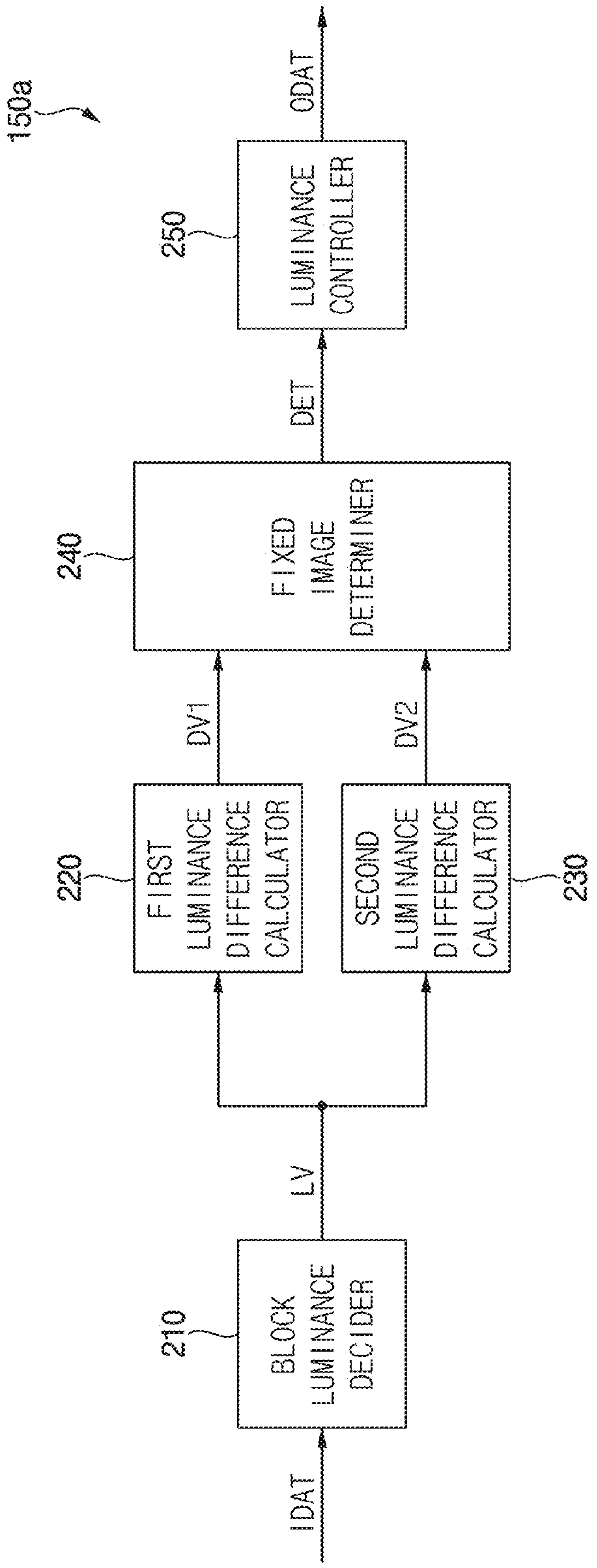
FIG. 4 is a block diagram illustrating a controller included in a display device according to embodiments.
Figure 6:
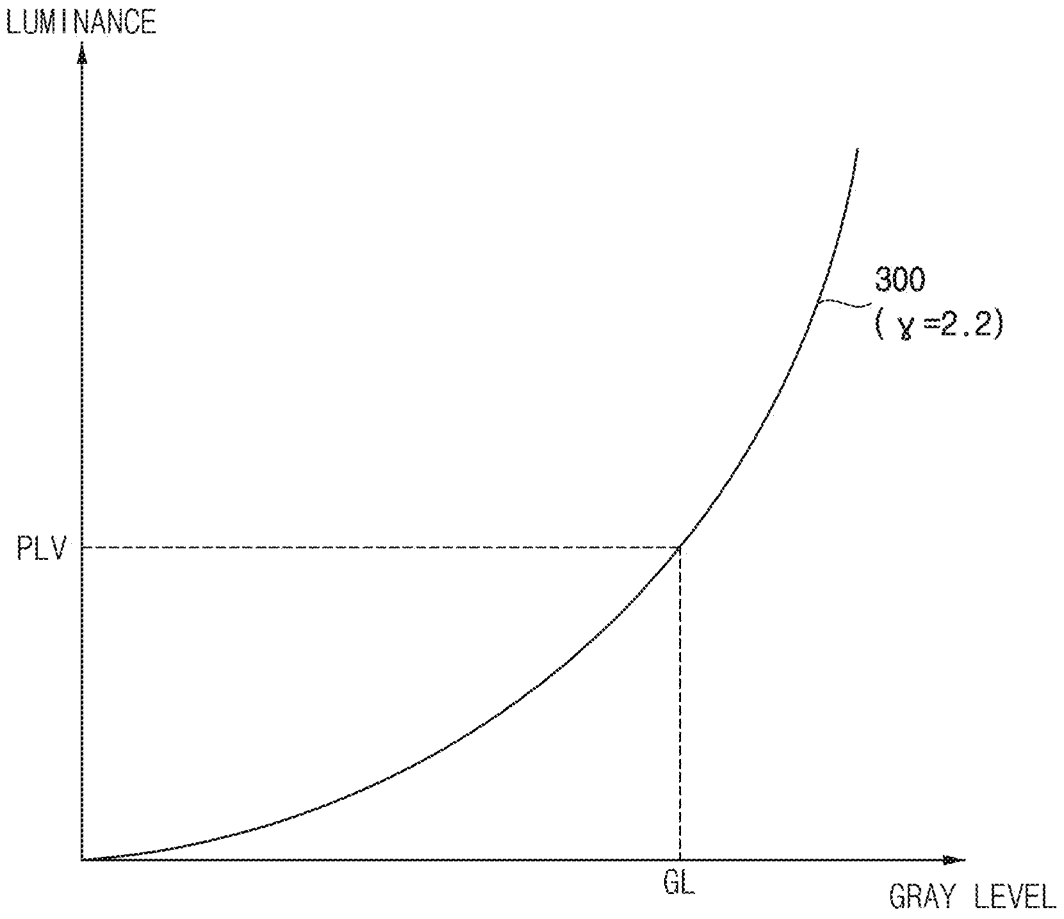
FIG. 6 is a diagram illustrating an example of a gamma curve used by a block luminance decider illustrated in FIG. 4.
Figure 7:
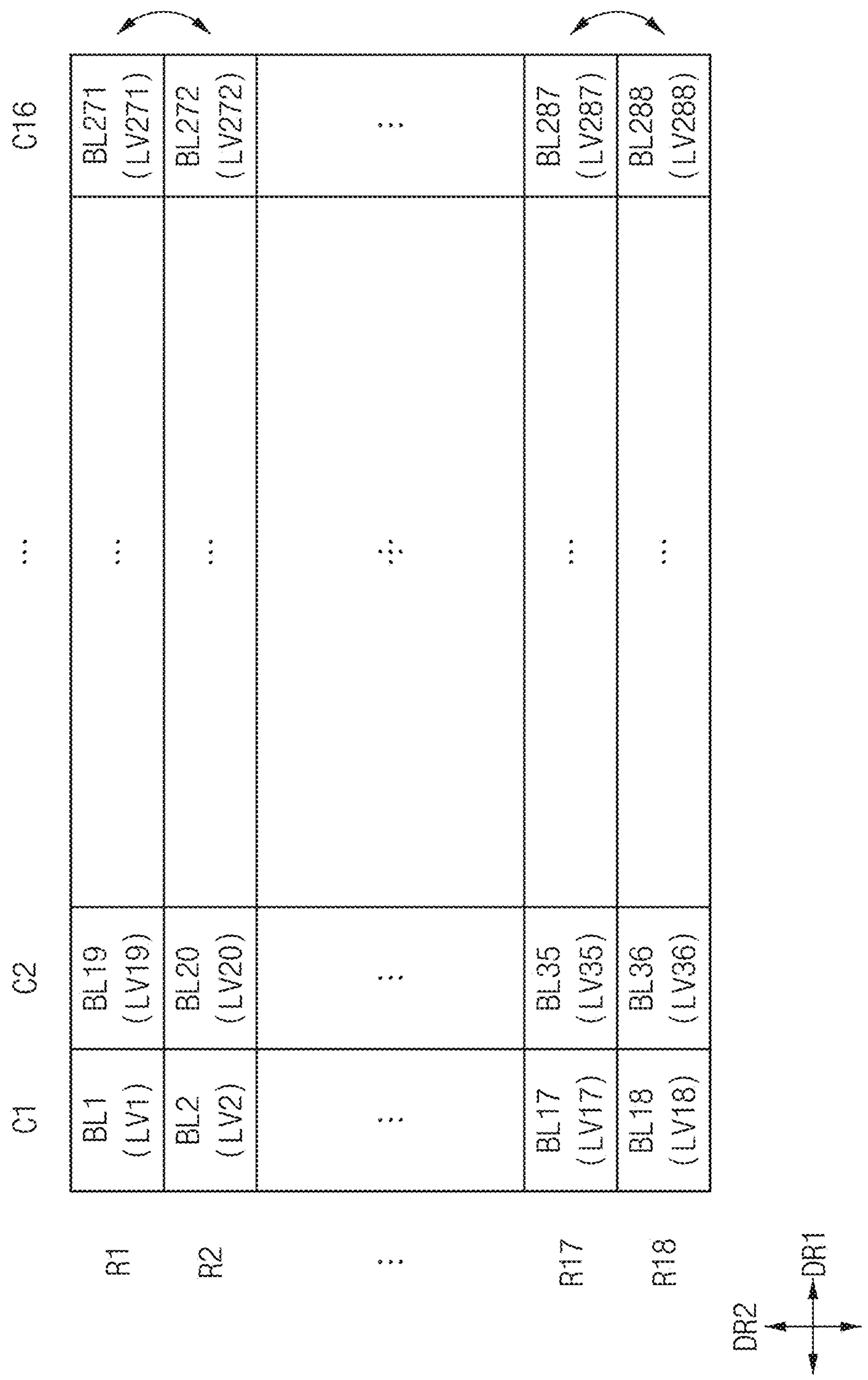
FIG. 7 is a diagram for describing an example of an operation of a first luminance difference calculator illustrated in FIG. 4.
Figure 8:
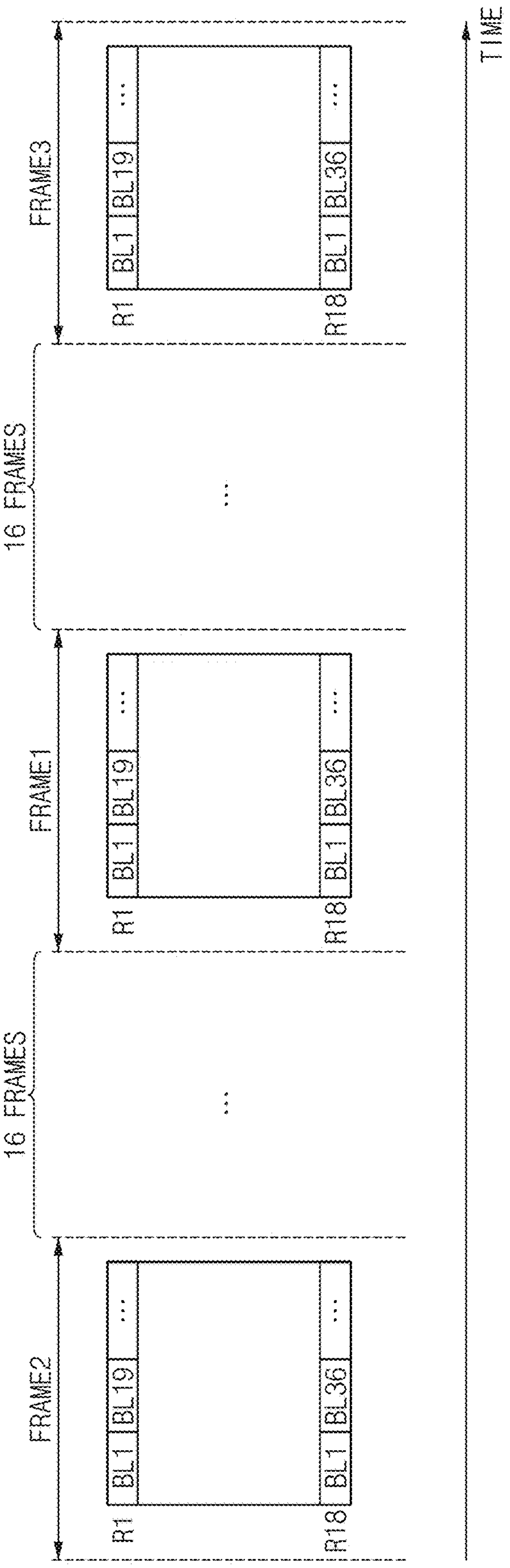
FIG. 8 is a diagram for describing an example of an operation of a second luminance difference calculator illustrated in FIG. 4.
Figure 9:
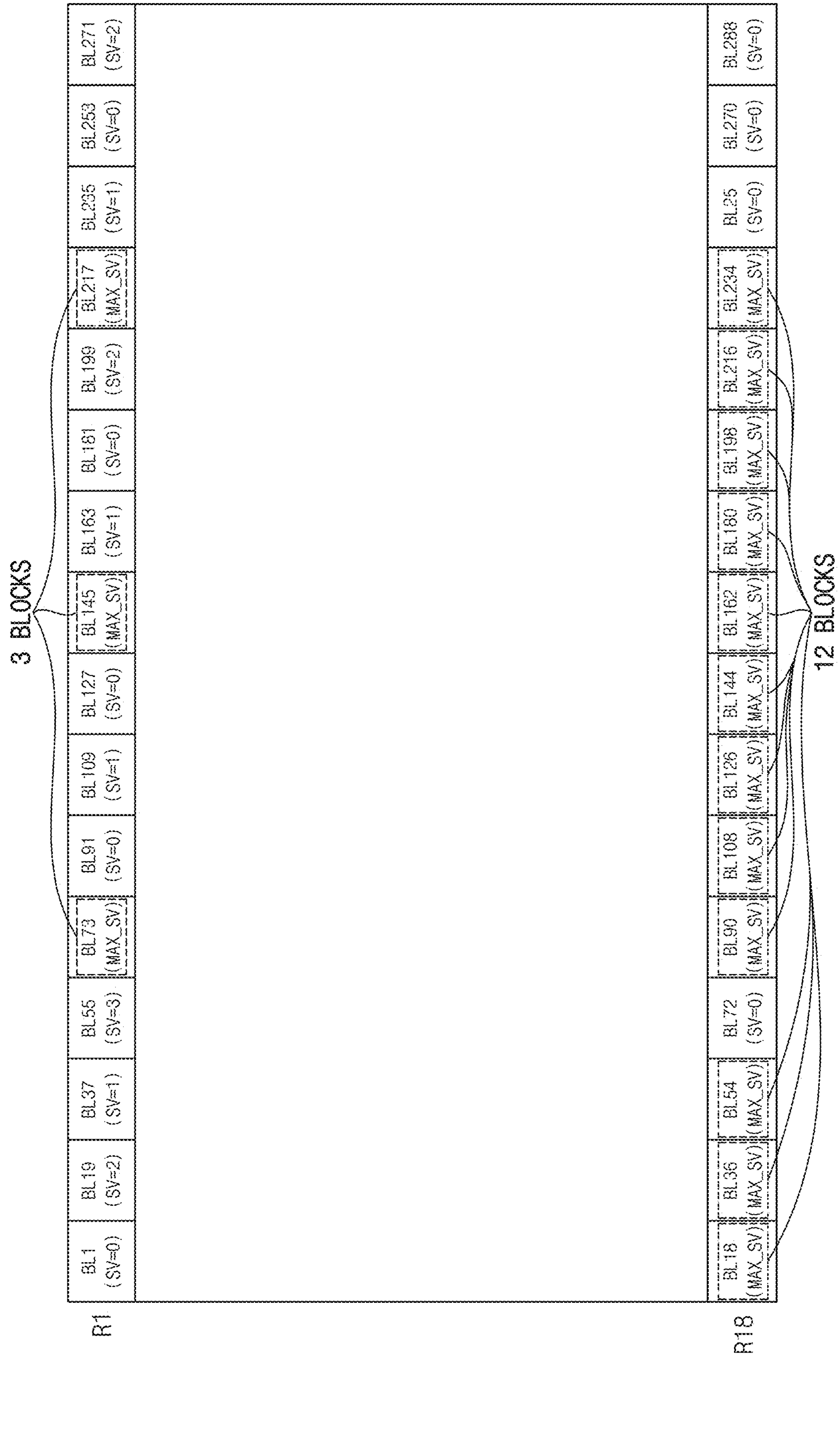
FIG. 9 is a diagram for describing an example of an operation of a fixed image determiner illustrated in FIG. 4.
Figure 10:
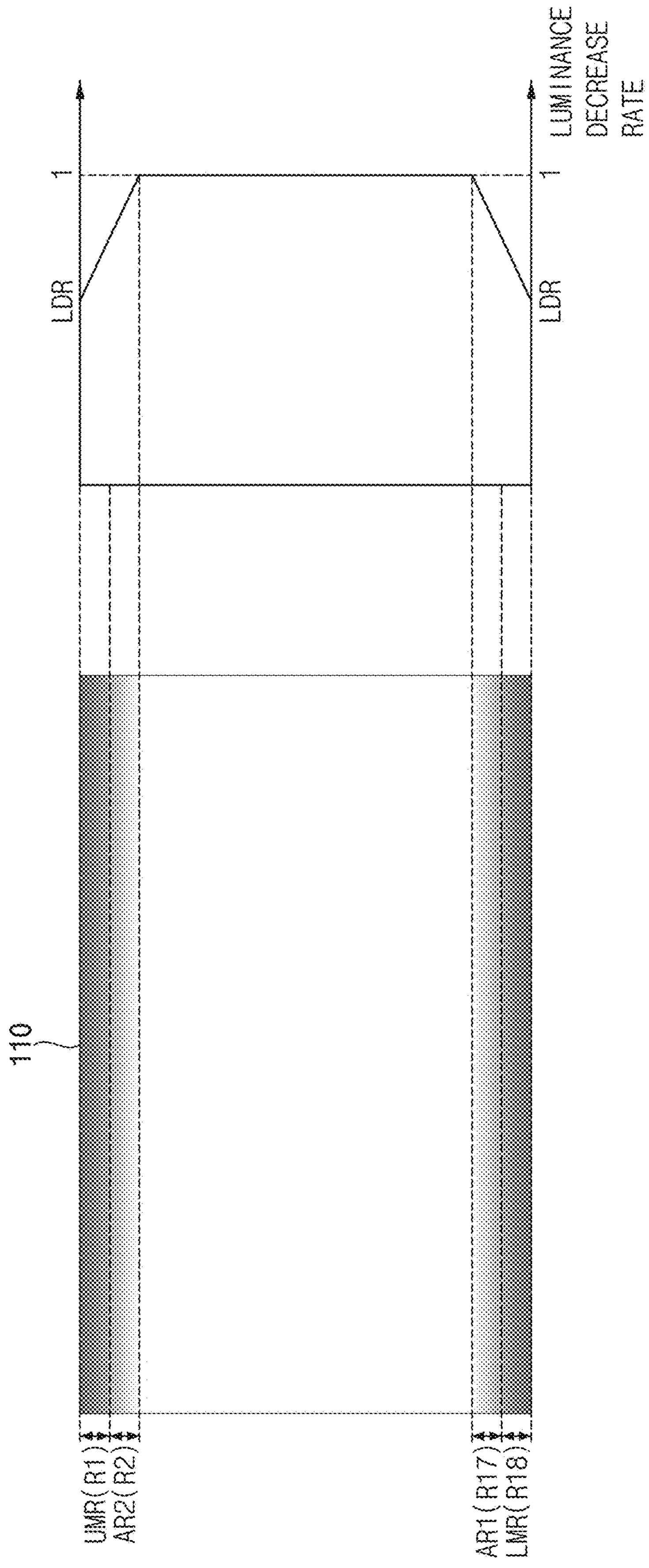
FIG. 10 is a diagram for describing an example of an outermost region luminance control operation performed by a luminance controller illustrated in FIG. 4.
Figure 11:
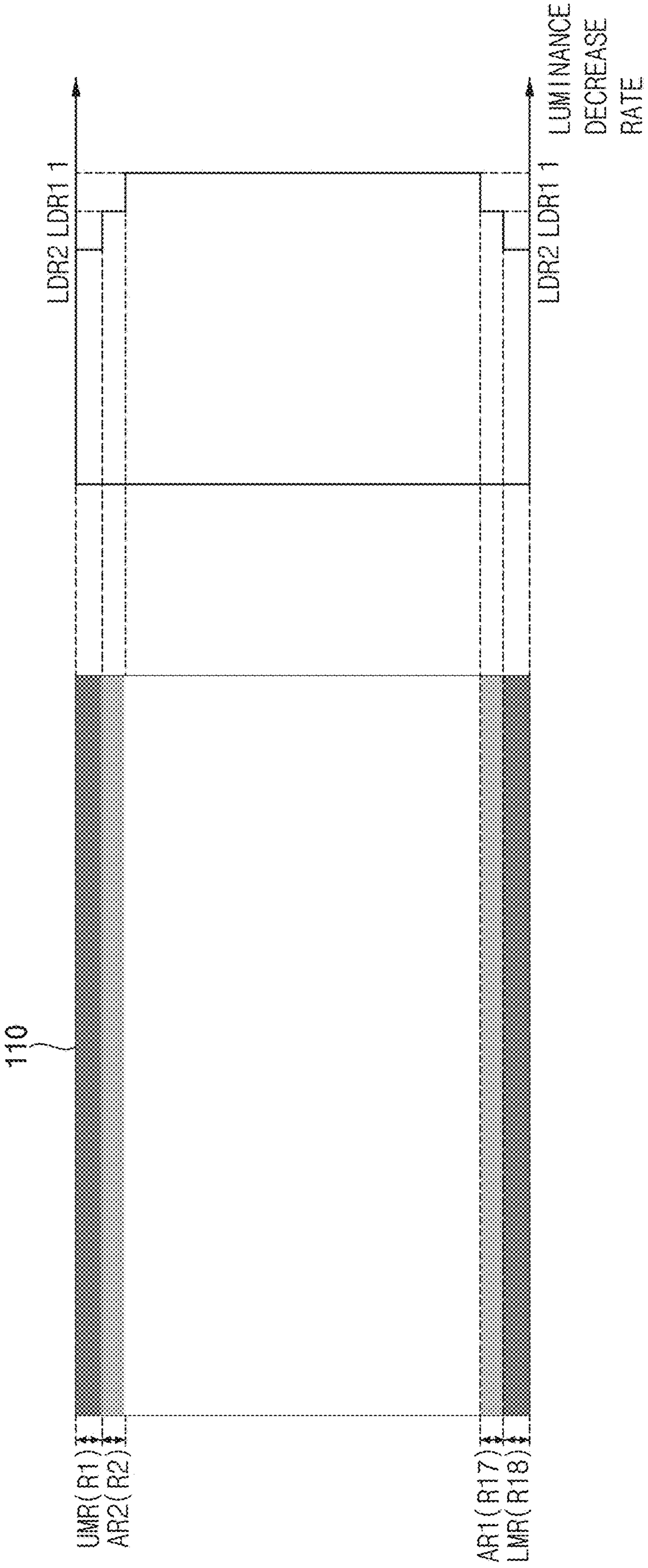
FIG. 11 is a diagram for describing another example of an outermost region luminance control operation performed by a luminance controller illustrated in FIG. 4.

FIG. 4 is a block diagram illustrating a controller included in a display device according to embodiments, FIG. 5 is a diagram illustrating an example where a display panel of a display device is divided into a plurality of blocks according to embodiments, FIG. 6 is a diagram illustrating an example of a gamma curve used by a block luminance decider illustrated in FIG. 4, FIG. 7 is a diagram for describing an example of an operation of a first luminance difference calculator illustrated in FIG. 4, FIG. 8 is a diagram for describing an example of an operation of a second luminance difference calculator illustrated in FIG. 4, FIG. 9 is a diagram for describing an example of an operation of a fixed image determiner illustrated in FIG. 4, FIG. 10 is a diagram for describing an example of an outermost region luminance control operation performed by a luminance controller illustrated in FIG. 4, and FIG. 11 is a diagram for describing another example of an outermost region luminance control operation performed by a luminance controller illustrated in FIG. 4.

Referring to FIG. 4, a controller 150*a* of a display device according to embodiments may include a block luminance decider 210, a first luminance difference calculator 220, a second luminance difference calculator 230, a fixed image determiner 240 and a luminance controller 250.

The block luminance decider 210 may divide a display panel of the display device into a plurality of blocks, each of which includes a plurality of pixels. In an embodiment, for example, as illustrated in FIG. 5, the block luminance decider 210 may divide the display panel two hundred eighty-eight blocks BL1 through BL288 that are arranged in a matrix form having sixteen block columns C1 through C16 and eighteen block rows R1 through R18. In an embodiment, for example, if the display panel has a resolution of 3840*2160, each block BL1 through BL288 may include 120*240 pixels.

Further, the block luminance decider 210 may decide a plurality of luminance values LV for the plurality of blocks BL1 through BL288 based on input image data IDAT. In some embodiments, the block luminance decider 210 may convert a plurality of gray levels represented by the input image data IDAT for a plurality of pixels included in each block BL1 through BL288 into a plurality of pixel luminance values. In an embodiment, for example, as illustrated in FIG. 6, the block luminance decider 210 may convert a gray level GL represented by the input image data IDAT into a pixel luminance value PLV with respect to each pixel by using a gamma curve 300. In an embodiment, for example, the gamma curve 300 may be, but is not limited to, a gamma curve having a gamma value γ of about 2.2. Further, the block luminance decider 210 may decide an average of the plurality of pixel luminance values PLV of each block BL1 through BL288 as the luminance value LV of the block BL1 through BL288.

With respect to each of outermost blocks located in an outermost region of the display panel among the plurality of blocks BL1 through BL288, the first luminance difference calculator 220 may calculate a first difference value DV1 between a luminance value LV of each of the outermost blocks and a luminance value of an adjacent block adjacent to each of the outermost blocks.

In some embodiments, the outermost region may be a lowermost region of the display panel, and the outermost blocks may be blocks BL18, BL36, . . . , and BL288 that are continuously arranged along a first direction DR1 (e.g., a horizontal direction) in an eighteenth block row R18 in an example illustrated in FIG. 7. Further, the adjacent blocks adjacent to the outermost blocks BL18, BL36, . . . , and BL288 may be blocks BL17, BL35, . . . , and BL287 that are adjacent to the outermost blocks BL18, BL36, . . . , and BL288 in a second direction DR2 (e.g., a vertical direction) substantially perpendicular to the first direction DR1, and that are arranged in a seventeenth block row R17. With respect to the outermost blocks BL18, BL36, . . . , and BL288, the first luminance difference calculator 220 may calculate first difference values DV1 between luminance values LV18, LV36, . . . , and LV288 of the outermost blocks BL18, BL36, . . . , and BL288 and luminance values LV17, LV35, . . . , and LV287 of the adjacent blocks BL17, BL35, . . . , and BL287, respectively.

In other embodiments, the outermost region may be an uppermost region of the display panel, and the outermost blocks may be blocks BL1, BL19, . . . , and BL271 that are continuously arranged along the first direction DR1 in a first block row R1 in the example illustrated in FIG. 7. Further, the adjacent blocks adjacent to the outermost blocks BL1, BL19, . . . , and BL271 may be blocks BL2, BL20, . . . , and BL272 that are adjacent to the outermost blocks BL1, BL19, . . . , and BL271 in the second direction DR2, and that are arranged in a second block row R2. With respect to the outermost blocks BL1, BL19, . . . , and BL271, the first luminance difference calculator 220 may calculate first difference values DV1 between luminance values LV1, LV19, . . . , and LV271 of the outermost blocks BL1, BL19, . . . , and BL271 and luminance values LV2, LV20, . . . , and LV272 of the adjacent blocks BL2, BL20, . . . , and BL272, respectively.

In still other embodiments, the outermost region may include the lowermost region and the uppermost region, and the outermost blocks may include the blocks BL18, BL36, . . . , and BL288 arranged in the eighteenth block row R18 and the blocks BL1, BL19, . . . , and BL271 arranged in the first block row R1. Further, the adjacent blocks may be the blocks BL17, BL35, . . . , and BL287 arranged in the seventeenth block row R17 with respect to the blocks BL18, BL36, . . . , and BL288 arranged in the eighteenth block row R18, and may be the blocks BL2, BL20, . . . , and BL272 arranged in the second block row R2 with respect to the blocks BL1, BL19, . . . , and BL271 arranged in the first block row R1. The first luminance difference calculator 220 may calculate the first difference values DV1 between the luminance values LV18, LV36, . . . , and LV288 of the outermost blocks BL18, BL36, . . . , and BL288 and the luminance values LV17, LV35, . . . , and LV287 of the adjacent blocks BL17, BL35, . . . , and BL287 with respect to the outermost blocks BL18, BL36, . . . , and BL288, respectively, and may calculate the first difference values DV1 between the luminance values LV1, LV19, . . . , and LV271 of the outermost blocks BL1, BL19, . . . , and BL271 and the luminance values LV2, LV20, . . . , and LV272 of the adjacent blocks BL2, BL20, . . . , and BL272 with respect to the outermost blocks BL1, BL19, . . . , and BL271, respectively.

With respect to each outermost block, the second luminance difference calculator 230 may calculate a second difference value DV2 between the luminance value LV of the outermost block in a first frame and the luminance value LV of the outermost block in a second frame different from the first frame. In some embodiments, the first frame may be a current frame, and the second frame may be an immediately previous frame, or a frame immediately preceding the current frame. In this case, with respect to each outermost block, the second luminance difference calculator 230 may calculate the second difference value DV2 between the luminance value LV in the current frame and the luminance value LV in the immediately previous frame.

In other embodiments, the first frame may be the current frame, and the second frame may be a previous frame apart from the current frame by an interval of at least one frame. In an embodiment, for example, as illustrated in FIG. 8, the second frame FRAME2 may be a previous frame apart from the first frame FRAME1 by an interval of sixteen frames, or a seventeenth previous frame from the first frame FRAME1. With respect to each outermost block BL1, BL18, BL19, BL36, . . . , the second luminance difference calculator 230 may calculate the second difference value DV2 between the luminance value LV in the first frame FRAME1 and the luminance value LV in the second frame FRAME2. Thereafter (e.g., after seventeen frames), with respect to each outermost block BL1, BL18, BL19, BL36, . . . , the second luminance difference calculator 230 may calculate the second difference value DV2 between the luminance value LV in a third frame FRAME3 and the luminance value LV in the first frame FRAME1. That is, the second luminance difference calculator 230 may periodically calculate the second difference value DV2 at regular time intervals.

The fixed image determiner 240 may determine whether a fixed image is displayed in the outermost region based on the first difference value DV1 and the second difference value DV2 of each of the outermost blocks. In some embodiments, the fixed image determiner 240 may determine that the fixed image is displayed in the outermost region when the first difference value is greater than or equal to a first reference difference value, and the number of the outermost blocks of which the second difference value is less than or equal to a second reference difference value is greater than or equal to a reference number.

In other embodiments, in each frame, the fixed image determiner 240 may increase a step value (e.g., by one) of each outermost block of which the first difference value DV1 is greater than or equal to the first reference difference value and the second difference value DV2 is less than or equal to the second reference difference value, and may decrease the step value (e.g., by one) of each outermost block of which the first difference value DV1 is less than the first reference difference value or the second difference value DV2 is greater than the second reference difference value. If the step value of the outermost block becomes greater than a maximum step value, the step value may be corrected to the maximum step value. Further, if the step value of the outermost block becomes less than a minimum step value, or 0, the step value may be corrected to 0. Further, the fixed image determiner 240 may count the number of the outermost blocks of which the step value is the maximum step value, and may determine that the fixed image is displayed in the outermost region when the counted number is greater than or equal to a reference number. In an embodiment, for example, as illustrated in FIG. 9, in a case where three blocks BL73, BL145 and BL217 of the blocks BL1, BL19, BL37, BL55, BL73, BL91, BL109, BL127, BL145, BL163, BL181, BL199, BL217, BL235, BL253 and BL271 arranged in the uppermost region or the first block row R1 have the maximum step value MAX_SV as the step value SV, and the reference number is ten, the fixed image determiner 240 may determine that the fixed image is not displayed in the outermost region, or the uppermost region. Further, as illustrated in FIG. 9, in a case where twelve blocks BL18, BL36, BL54, BL90, BL108, BL126, BL144, BL162, BL180, BL198, BL216 and BL234 of the blocks BL18, BL36, BL54, BL72, BL90, BL108, BL126, BL144, BL162, BL180, BL198, BL216, BL234, BL252, BL270 and BL288 arranged in the lowermost region or the eighteenth block row R18 have the maximum step value MAX_SV as the step value SV, and the reference number is ten, the fixed image determiner 240 may determine that the fixed image is displayed in the outermost region, or the lowermost region. In this way, even if all of the blocks BL18, BL36, . . . , BL288 in the lowermost region (or the uppermost region) do not have the maximum step value MAX_SV, by checking that the number of blocks BL18, BL36, BL54, BL90, BL108, BL126, BL144, BL162, BL180, BL198, BL216 and BL234 having the maximum step value MAX_SV is greater than the reference number, a horizontal continuity of the lowermost region (or the uppermost region) may be checked, and it may be determined that the fixed image is displayed in the lowermost region (or the uppermost region).

The luminance controller 250 may receive a determination signal DET representing whether the fixed image is displayed in the outermost region from the fixed image determiner 240, and may perform an outermost region luminance control operation to decrease a luminance of the outermost region when the determination signal DET indicates that the fixed image is displayed in the outermost region. In an embodiment, for example, when the fixed image is displayed in the outermost region, the luminance controller 250 may decrease gray levels represented by the input image data IDAT with respect to the outermost region to generate output image data ODAT representing the decreased gray levels with respect to the outermost region, thereby decreasing the luminance of the outermost region.

In some embodiments, as illustrated in FIG. 10, when the fixed image is displayed in the lowermost region LMR corresponding to the eighteenth block row R18, the luminance controller 250 may gradually decrease a luminance of a first adjacent region AR1 corresponding to the seventeenth block row R17 and the lowermost region LMR corresponding to the eighteenth block row R18 as a distance from a center of the display panel 110 increases. In an embodiment, for example, with respect to the same gray level, the luminance controller 250 may linearly decrease the luminance of the first adjacent region AR1 and the lowermost region LMR from a luminance decrease rate of 1 to a predetermined luminance decrease rate LDR. Further, as illustrated in FIG. 10, when the fixed image is displayed in the uppermost region UMR corresponding to the first block row R1, the luminance controller 250 may gradually decrease a luminance of a second adjacent region AR2 corresponding to the second block row R2 and the uppermost region UMR corresponding to the first block row R1 as a distance from the center of the display panel 110 increases. In an embodiment, for example, with respect to the same gray level, the luminance controller 250 may linearly decrease the luminance of the second adjacent region AR2 and the uppermost region UMR from the luminance decrease rate of 1 to the predetermined luminance decrease rate LDR.

In other embodiments, as illustrated in FIG. 11, when the fixed image is displayed in the lowermost region LMR corresponding to the eighteenth block row R18, the luminance controller 250 may decrease the luminance of the first adjacent region AR1 corresponding to the seventeenth block row R17 with a first luminance decrease rate LDR1, and may decrease the luminance of the lowermost region LMR corresponding to the eighteenth block row R18 with a second luminance decrease rate LDR2 lower than the first luminance decrease rate LDR1. Therefore, the decreased luminance of the first adjacent region AR1 becomes the value of the first luminance decrease rate LDR1 times the original luminance of the first adjacent region AR1 before the adjustment, and the decreased luminance of the lowermost region LMR becomes the value of the second luminance decrease rate LDR2 times the original luminance of the lowermost region LMR before the adjustment. Further, as illustrated in FIG. 11, when the fixed image is displayed in the uppermost region UMR corresponding to the first block row R1, the luminance controller 250 may gradually decrease the luminance of the second adjacent region AR2 corresponding to the second block row R2 with the first luminance decrease rate LDR1, and may decrease the luminance of the uppermost region UMR corresponding to the first block row R1 with the second luminance decrease rate LDR2 lower than the first luminance decrease rate LDR1. Therefore, the decreased luminance of the second adjacent region AR2 becomes the value of the first luminance decrease rate LDR1 times the original luminance of the second adjacent region AR2 before the adjustment, and the decreased luminance of the uppermost region UMR becomes the value of the second luminance decrease rate LDR2 times the original luminance of the uppermost region UMR before the adjustment.

As described above, the controller **150*a* according to embodiments may decrease the luminance of the outermost region (e.g., the lowermost region LMR and/or the uppermost region UMR) that displays the fixed image. Accordingly, an occurrence of an afterimages (or mura) in the outermost region may be effectively prevented or delayed, and the life of the display device including the controller 150***a* may be effectively extended.

Figure 12:
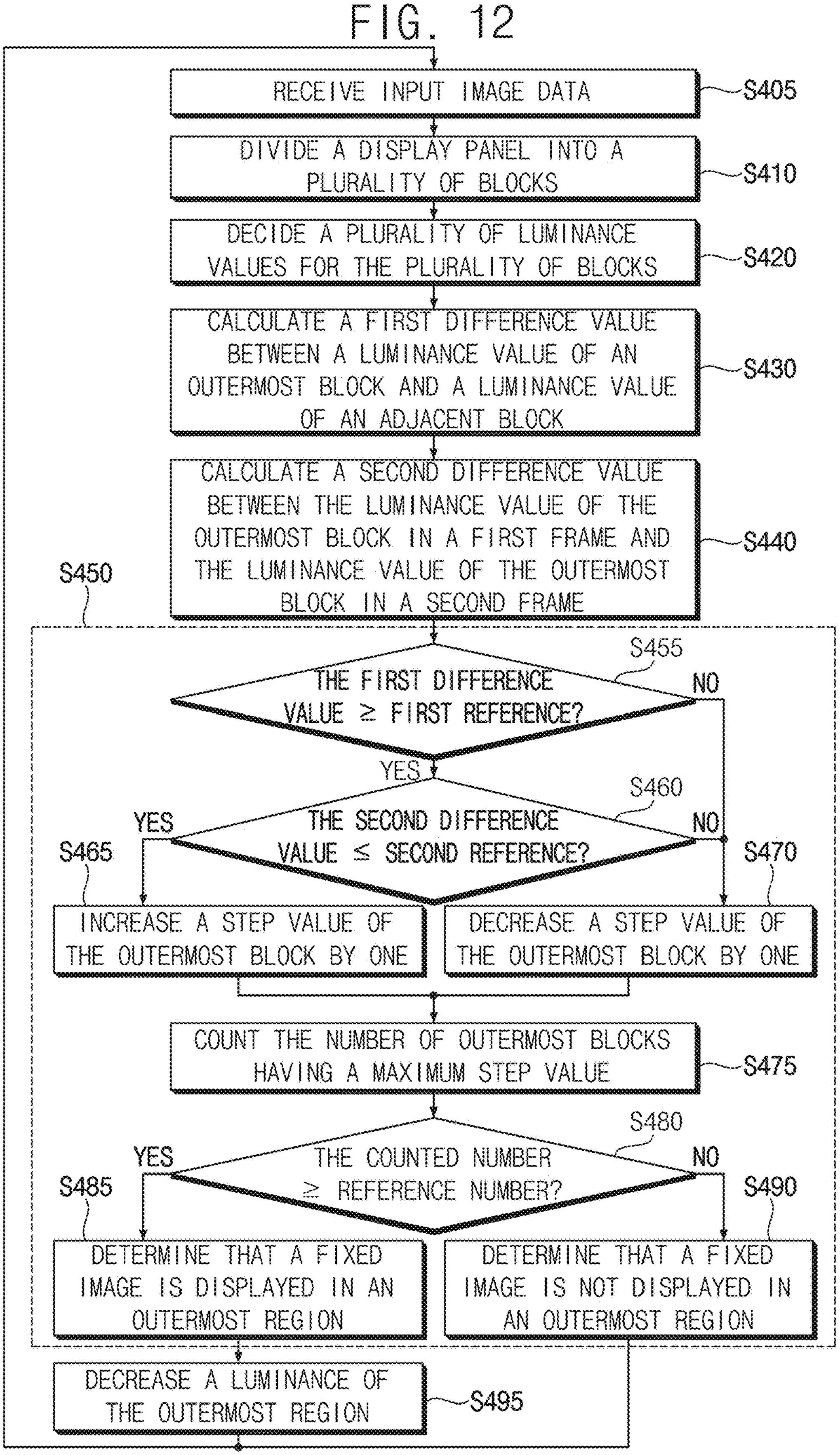
FIG. 12 is a flowchart illustrating a method of controlling a luminance of a display device according to embodiments.

FIG. 12 is a flowchart illustrating a method of controlling a luminance of a display device according to embodiments.

Referring to FIGS. 4 and 12, a block luminance decider 210 may receive input image data IDAT in each frame (S405), may divide a display panel into a plurality of blocks (S410), and may decide a plurality of luminance values ("LV") for the plurality of blocks based on the input image data IDAT (S420).

With respect to each of outermost blocks located in an outermost region of the display panel among the plurality of blocks, a first luminance difference calculator 220 may calculate a first difference value DV1 between a luminance value LV of each of the outermost blocks and a luminance value LV of an adjacent block adjacent to each of the outermost blocks (S430).

With respect to each outermost block, a second luminance difference calculator 230 may calculate a second difference value DV2 between the luminance value LV of each of the outermost blocks in a first frame and the luminance value LV of each of the outermost blocks in a second frame different from the first frame (S440).

A fixed image determiner 240 may determine whether a fixed image is displayed in the outermost region based on the first difference value DV1 and the second difference value DV2 of each of the outermost blocks (S450).

In some embodiments, for each outermost block, if the first difference value DV1 is greater than or equal to a first reference difference value (S455: YES) and the second difference value DV2 is less than or equal to a second reference difference value (S460: YES), the fixed image determiner 240 may increase a step value of the outermost block by one (S465). Alternatively, for each outermost block, if the first difference value DV1 is less than the first reference difference value (S455: NO), or if the second difference value DV2 is greater than the second reference difference value (S460: NO), the fixed image determiner 240 may decrease the step value of the outermost block by one (S470). If the step value of the outermost block becomes greater than a maximum step value, the step value may be corrected to the maximum step value. Further, if the step value of the outermost block becomes less than a minimum step value, or 0, the step value may be corrected to 0. Further, the fixed image determiner 240 may count the number of the outermost blocks of which the step value is the maximum step value (S475). If the counted number is less than a reference number (SS480: NO), the fixed image determiner 240 may determine that the fixed image is not displayed in the outermost region (S490), and the luminance controller 250 may not decrease a luminance of the outermost region. Alternatively, if the counted number is greater than or equal to the reference number (SS480: YES), the fixed image determiner 240 may determine that the fixed image is displayed in the outermost region (S485), and the luminance controller 250 may decrease the luminance of the outermost region (S495). Thus, even if the input image data IDAT represents the same gray level, the luminance of the outermost region when the fixed image (e.g., a task bar image) is displayed in the outermost region may be lower than the luminance of the outermost image when the fixed image is not displayed in the outermost region. Accordingly, an occurrence of an afterimage (or mura) in the outermost region may be effectively prevented or delayed, and the life of the display device may be effectively extended.

Figure 13:
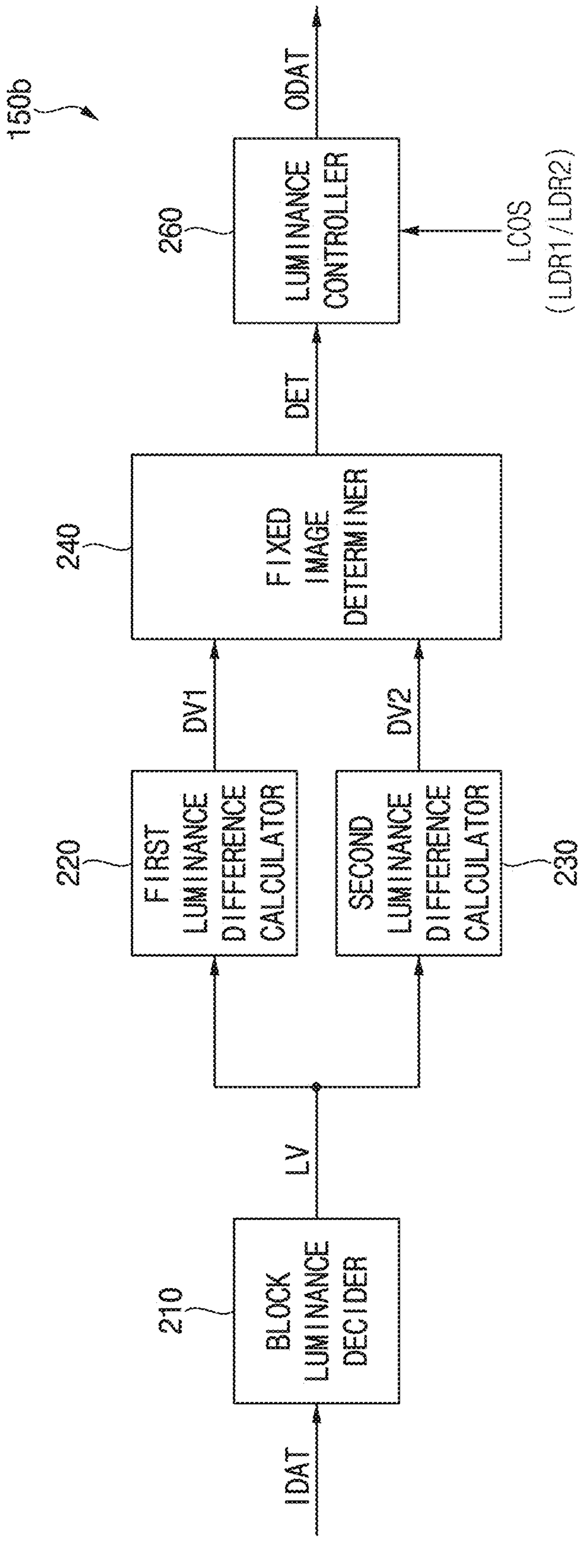
FIG. 13 is a block diagram illustrating a controller included in a display device according to embodiments.
Figure 14:
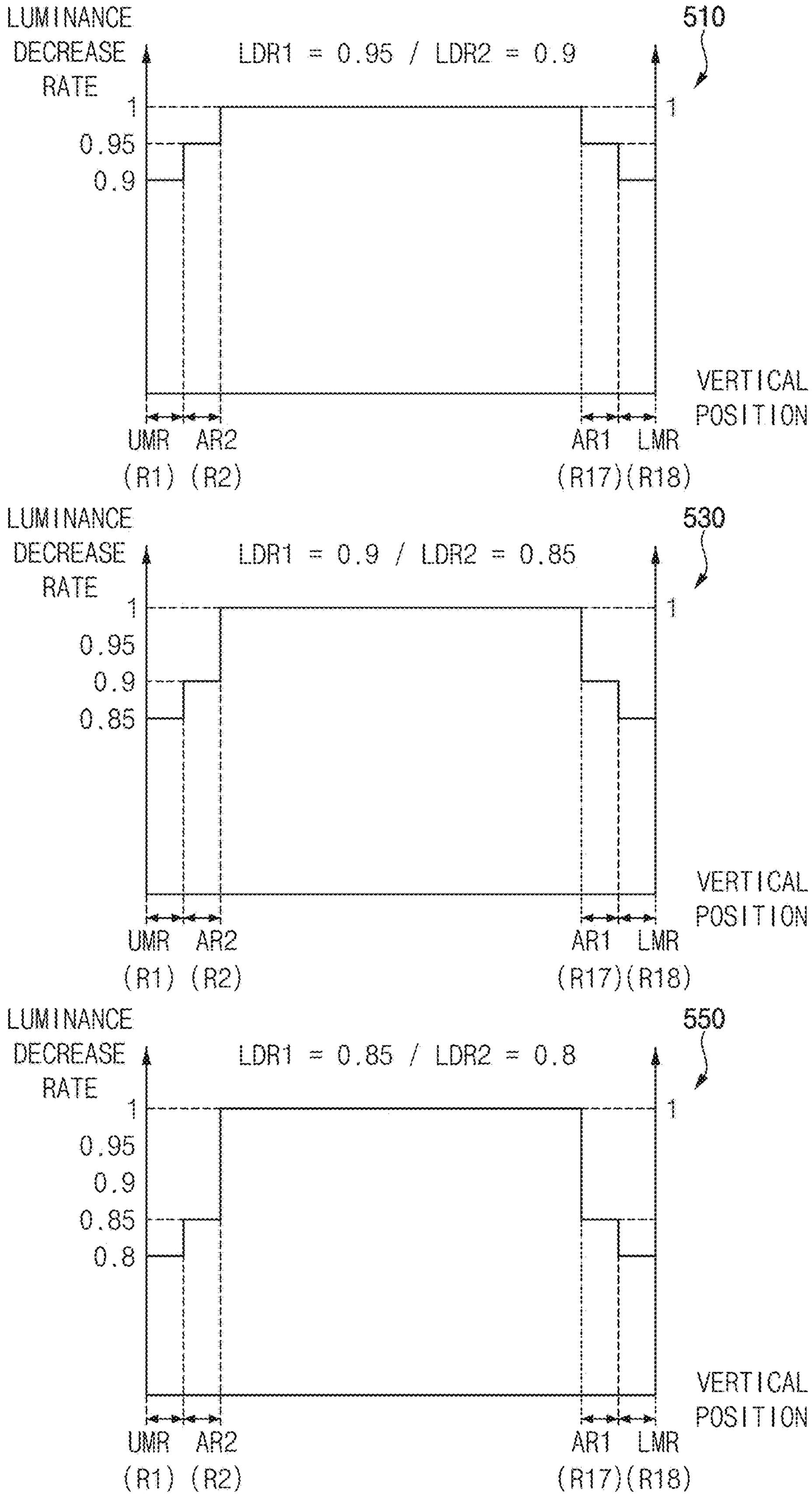
FIG. 14 is a diagram for describing examples of an outermost region luminance control operation according to a luminance control option signal.

FIG. 13 is a block diagram illustrating a controller included in a display device according to embodiments, and FIG. 14 is a diagram for describing examples of an outermost region luminance control operation according to a luminance control option signal.

Referring to FIG. 13, a controller 150*b* of a display device according to embodiments may include a block luminance decider 210, a first luminance difference calculator 220, a second luminance difference calculator 230, a fixed image determiner 240 and a luminance controller 260. The controller 150*b* of FIG. 13 may have a similar configuration and similar operation to a controller 150*a* of FIG. 4, except that the luminance controller 260 may receive a luminance control option signal LCOS, and may perform an outermost region luminance control operation based on the luminance control option signal LCOS.

The luminance controller 260 may receive the luminance control option signal LCOS representing a first luminance decrease rate LDR1 and a second luminance decrease rate LDR2 from an external host processor. When a fixed image is displayed in an outermost region, the luminance controller 260 may decrease a luminance of an adjacent region adjacent to the outermost region with a first luminance decrease rate LDR1, and may decrease a luminance of the outermost region with a second luminance decrease rate LDR2.

In an embodiment, for example, as illustrated in a first graph 510 of FIG. 14, in a case where the luminance control option signal LCOS represents a first luminance decrease rate LDR1 of about 0.95 and a second luminance decrease rate LDR2 of about 0.9, the luminance controller 260 may decrease luminances of a first adjacent region AR1 and a second adjacent region AR2 adjacent to a lowermost region LMR and an uppermost region UMR, respectively, with the first luminance decrease ratio LDR1 of about 0.95, and may decrease luminances of the lowermost region LMR and the uppermost region UMR with the second luminance decrease ratio LDR2 of about 0.9. That is, the adjusted luminances of the first adjacent region AR1 and the second adjacent region AR2 become 0.95 times of original luminances of the first adjacent region AR1 and the second adjacent region AR2 before the adjustment, respectively. Further, as illustrated in a second graph 530 of FIG. 14, in a case where the luminance control option signal LCOS represents a first luminance decrease rate LDR1 of about 0.9 and a second luminance decrease rate LDR2 of about 0.85, the luminance controller 260 may decrease luminances of a first adjacent region AR1 and a second adjacent region AR2 respectively adjacent to a lowermost region LMR and an uppermost region UMR with the first luminance decrease ratio LDR1 of about 0.9, and may decrease luminances of the lowermost region LMR and the uppermost region UMR with the second luminance decrease ratio LDR2 of about 0.85. Further, as illustrated in a third graph 550 of FIG. 14, in a case where the luminance control option signal LCOS represents a first luminance decrease rate LDR1 of about 0.85 and a second luminance decrease rate LDR2 of about 0.8, the luminance controller 260 may decrease luminances of a first adjacent region AR1 and a second adjacent region AR2 respectively adjacent to a lowermost region LMR and an uppermost region UMR with the first luminance decrease ratio LDR1 of about 0.85, and may decrease luminances of the lowermost region LMR and the uppermost region UMR with the second luminance decrease ratio LDR2 of about 0.8.

Figure 15:
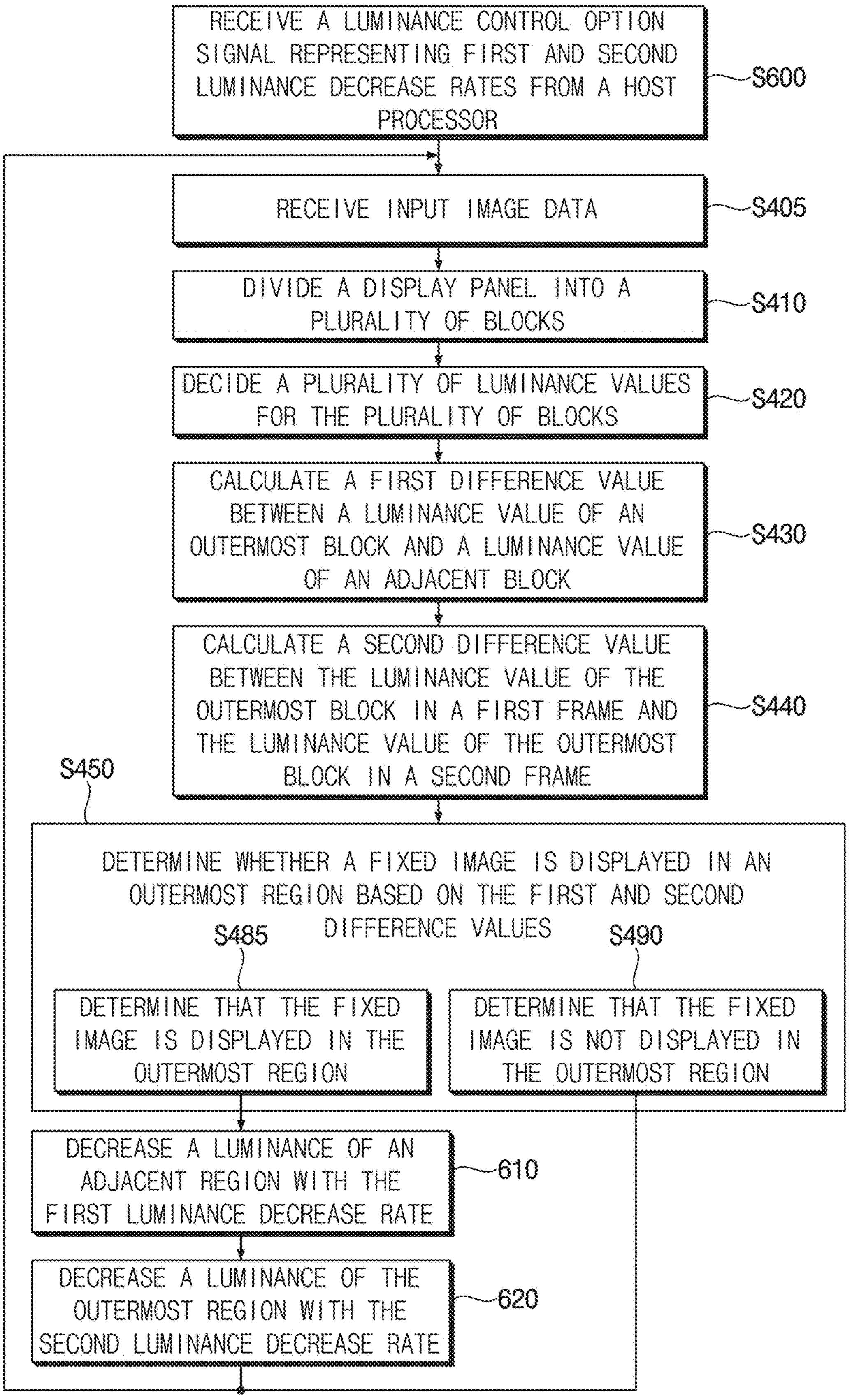
FIG. 15 is a flowchart illustrating a method of controlling a luminance of a display device according to embodiments.

FIG. 15 is a flowchart illustrating a method of controlling a luminance of a display device according to embodiments.

A luminance control method of FIG. 15 may be similar to a luminance control method of FIG. 12, except that a luminance control option signal may be received (S600), and an outermost region luminance control operation may be performed based on the luminance control option signal (S610 and S620).

Referring to FIGS. 13 and 15, a luminance controller 260 may receive the luminance control option signal LCOS representing a first luminance decrease rate LDR1 and a second luminance decrease rate LDR2 from an external host processor (S600).

A block luminance decider 210 may receive input image data IDAT (S405), may divide a display panel into a plurality of blocks (S410), and may decide a plurality of luminance values ("LV") for the plurality of blocks based on the input image data IDAT (S420).

With respect to each outermost block among the plurality of blocks, a first luminance difference calculator 220 may calculate a first difference value DV1 between a luminance value LV of each outermost block and a luminance value LV of an adjacent block adjacent to the outermost block (S430).

With respect to each outermost block, a second luminance difference calculator 230 may calculate a second difference value DV2 between the luminance value LV of each outermost block in a first frame and the luminance value LV of the outermost block in a second frame different from the first frame (S440).

A fixed image determiner 240 may determine whether a fixed image is displayed in an outermost region based on the first difference value DV1 and the second difference value DV2 of each outermost block (S450). If the fixed image determiner 240 determines that the fixed image is not displayed in the outermost region (S490), a luminance controller 260 may not decrease a luminance of the outermost region.

If the fixed image determiner 240 determines that the fixed image is displayed in the outermost region (S485), the luminance controller 260 may decrease a luminance of an adjacent region adjacent to the outermost region with the first luminance decrease rate LDR1 of the luminance control option signal LCOS (S610), and may decrease a luminance of the outermost region with the second luminance decrease rate LDR2 of the luminance control option signal LCOS (S620).

Figure 16:
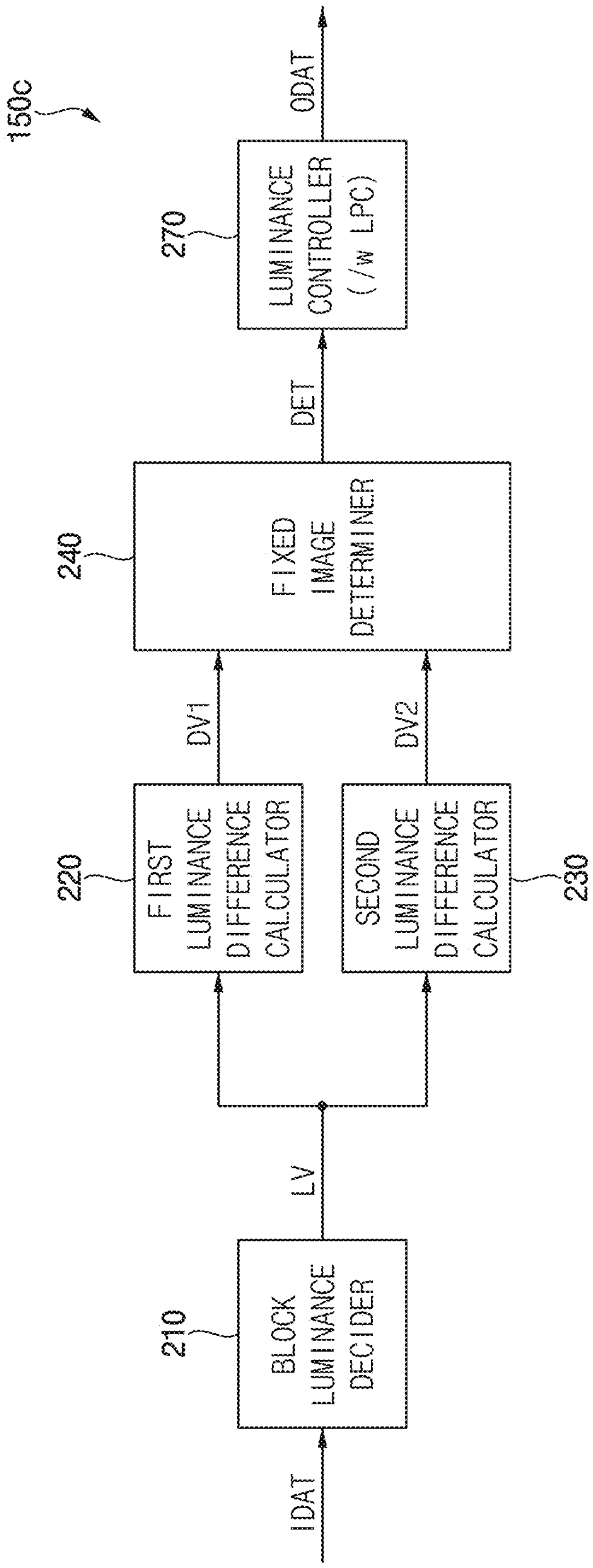
FIG. 16 is a block diagram illustrating a controller included in a display device according to embodiments.
Figure 17:
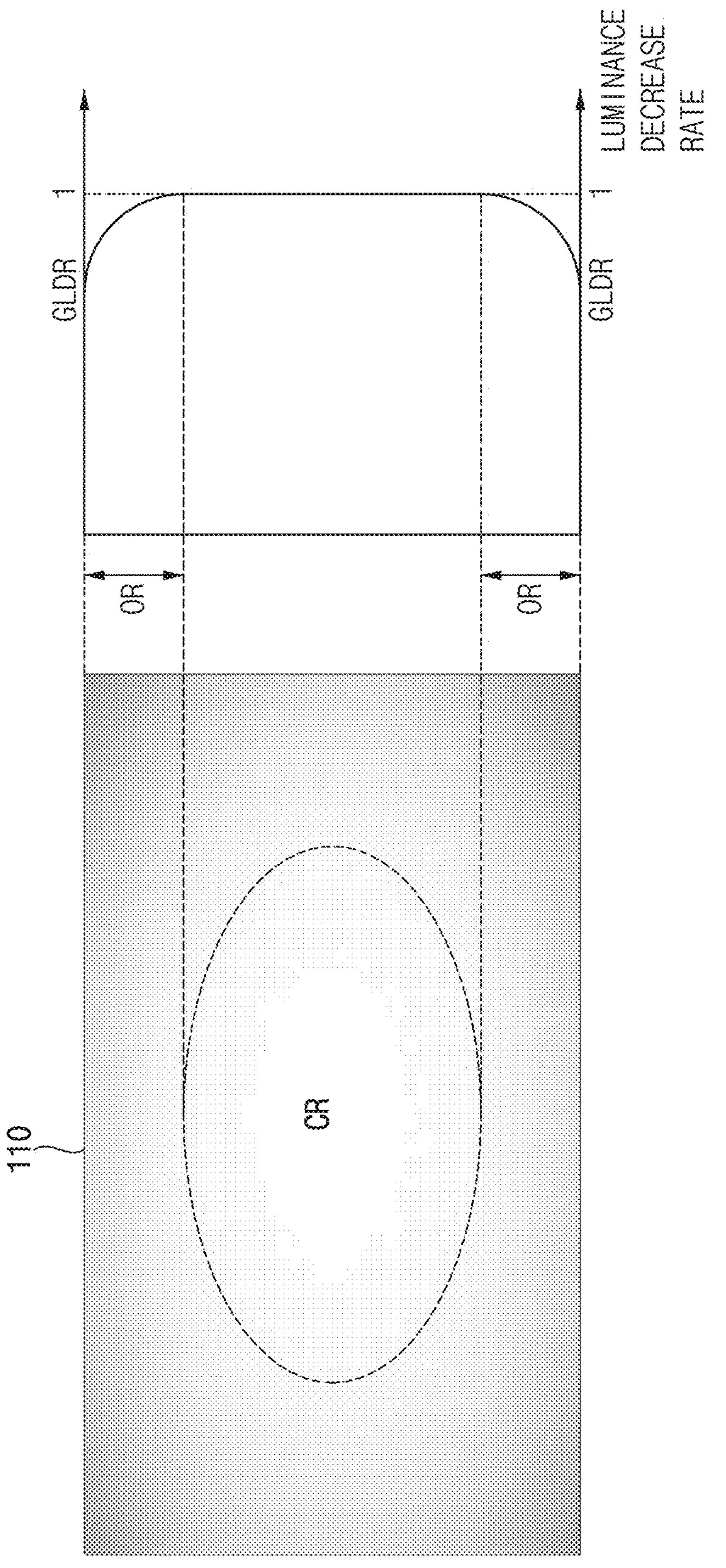
FIG. 17 is a diagram for describing an example of a global luminance control operation performed by a luminance controller illustrated in FIG. 16.
Figure 18:
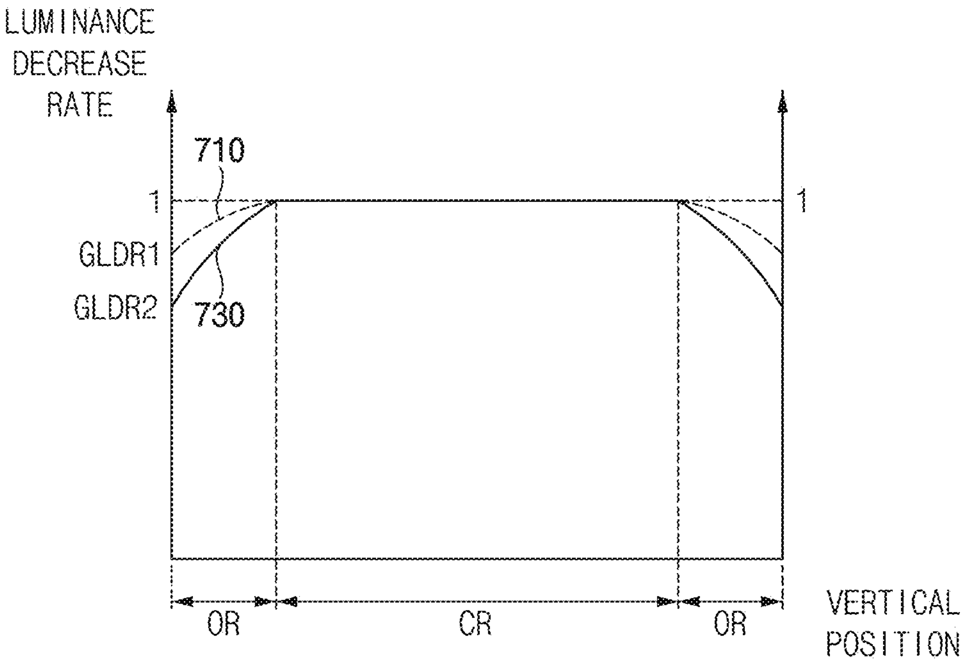
FIG. 18 is a diagram for describing another example of a global luminance control operation performed by a luminance controller illustrated in FIG. 16.

FIG. 16 is a block diagram illustrating a controller included in a display device according to embodiments, FIG. 17 is a diagram for describing an example of a global luminance control operation performed by a luminance controller illustrated in FIG. 16, and FIG. 18 is a diagram for describing another example of a global luminance control operation performed by a luminance controller illustrated in FIG. 16.

Referring to FIG. 16, a controller 150*c* of a display device according to embodiments may include a block luminance decider 210, a first luminance difference calculator 220, a second luminance difference calculator 230, a fixed image determiner 240 and a luminance controller 270. The controller 150*c* of FIG. 16 may have a similar configuration and similar operation to a controller 150*a* of FIG. 4, except that the luminance controller 270 may perform a global luminance control operation that controls a luminance of an entire region of a display panel along with an outermost region luminance control operation that decreases a luminance of an outermost region displaying a fixed image.

The luminance controller 270 may perform the global luminance control operation that controls the luminance of the entire region of the display panel. In some embodiments, as illustrated in FIG. 17, to perform the global luminance control operation, the luminance controller 270 may gradually decreases a luminance of an outer region OR according to a distance from a center region CR of the display panel 110. In an embodiment, for example, the luminance controller 270 may maintain a luminance of the center region CR having an elliptical shape, and may decrease the luminance of the outer region OR by using a luminance decrease rate that gradually decreases from a luminance decrease rate of 1 to a predetermined global luminance decrease rate GLDR as the distance from the center region CR increases. Since a user of the display device mainly views the center region CR of the display panel 110, even if the luminance of the outer region OR far from the center region CR decreases, the user may not perceive this decrease in luminance. Further, power consumption of the display device may be reduced by the global luminance control operation, and thus the global luminance control operation may be called a low power control ("LPC") operation.

Further, in addition to the global luminance control operation, the luminance controller 270 may further perform the outermost region luminance control operation to decrease the luminance of the outermost region displaying the fixed image. In an embodiment, for example, when the fixed image is displayed in the outermost region, with respect to each pixel in the outermost region, the luminance controller 270 may calculate a final luminance decrease rate by multiplying a global luminance decrease rate by the global luminance control operation and a luminance decrease rate by the outermost region luminance control operation, and may decrease a luminance of each pixel in the outermost region with the final luminance decrease rate.

In some embodiments, the luminance controller 270 may perform the global luminance control operation with different global luminance decrease rates when the fixed image is not displayed in the outermost region and when the fixed image is displayed in the outermost region. In an embodiment, for example, when it is determined that the fixed image is not displayed in the outermost region, as illustrated in a first graph 710 of FIG. 18, the luminance controller 270 may perform the global luminance control operation with a first global luminance decrease rate GLDR1. Alternatively, when it is determined that the fixed image is displayed in the outermost region, as illustrated in a second graph 730 of FIG. 18, the luminance controller 270 may perform not only the outermost region luminance control operation, but also the global luminance control operation with a second global luminance decrease rate GLDR2 lower than the first global luminance decrease rate GLDR1. Accordingly, an occurrence of an afterimage (or mura) in the outermost region may be further prevented or delayed.

Figure 19:
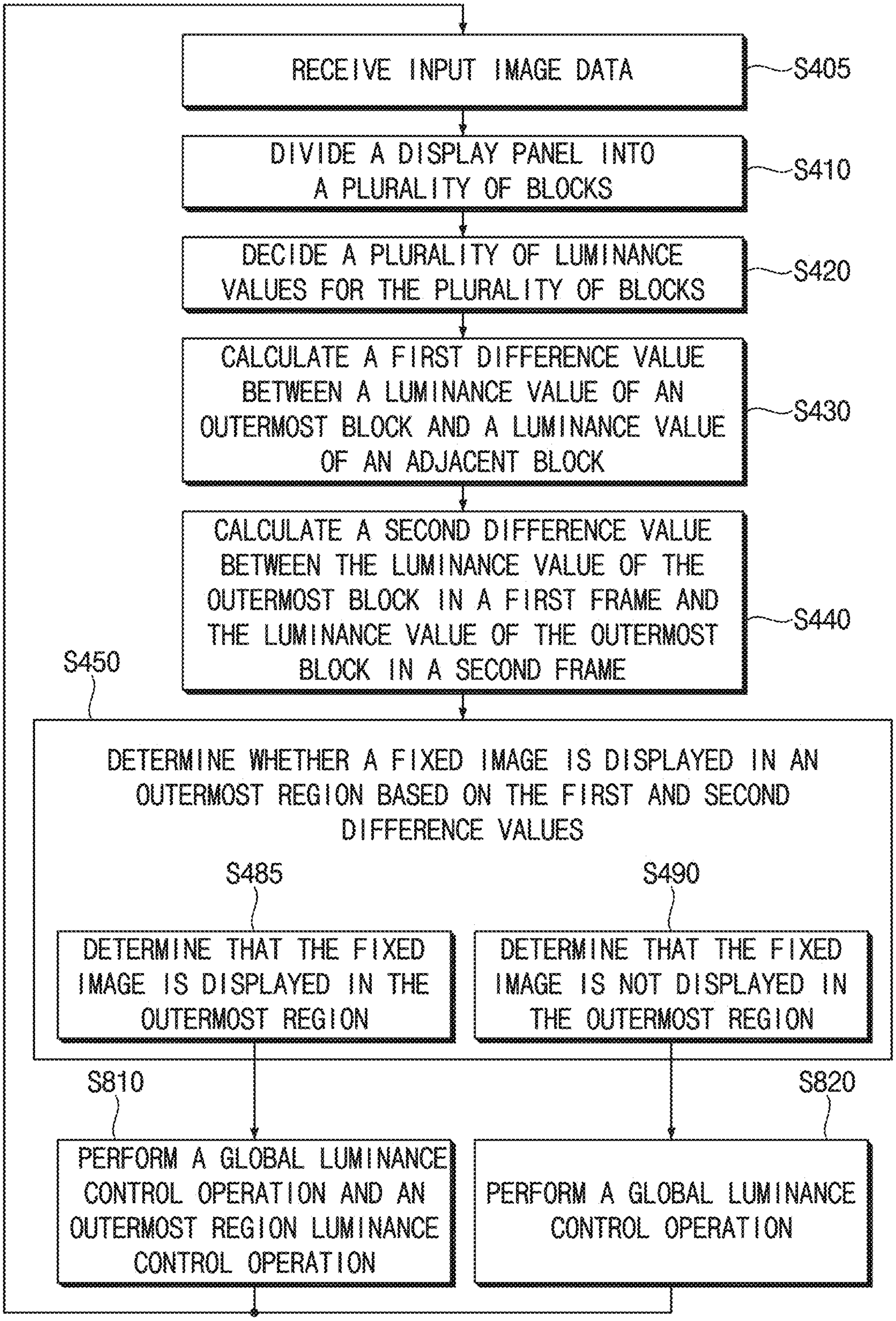
FIG. 19 is a flowchart illustrating a method of controlling a luminance of a display device according to embodiments.
Figure 20:
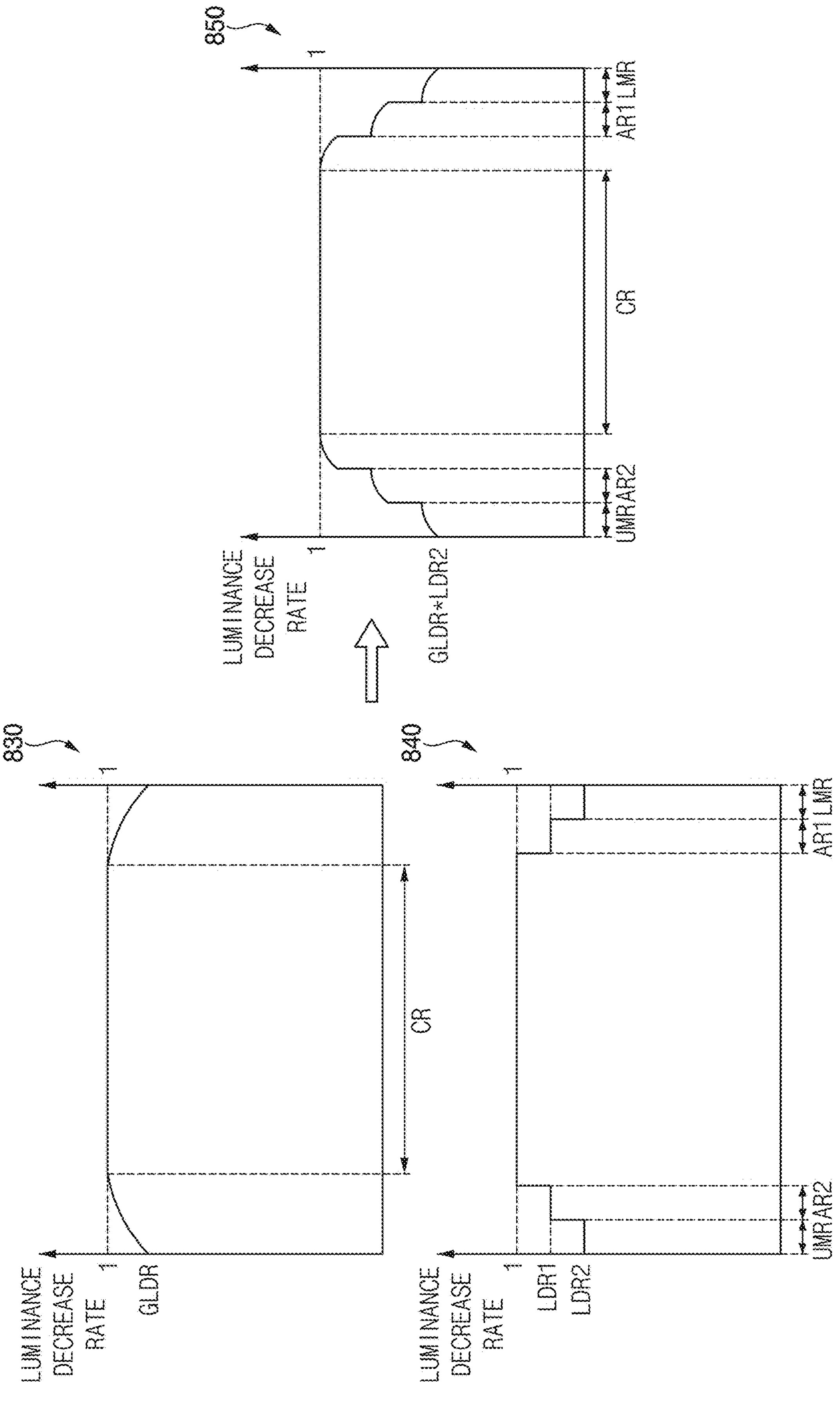
FIG. 20 is a diagram for describing an example of a final luminance decrease rate by a global luminance control operation and an outermost region luminance control operation performed in a luminance control method of FIG. 19.

FIG. 19 is a flowchart illustrating a method of controlling a luminance of a display device according to embodiments, and FIG. 20 is a diagram for describing an example of a final luminance decrease rate by a global luminance control operation and an outermost region luminance control operation performed in a luminance control method of FIG. 19.

A luminance control method of FIG. 19 may be similar to a luminance control method of FIG. 12, except that a global luminance control operation may be further performed (S810 and S820).

Referring to FIGS. 16 and 19, a block luminance decider 210 may receive input image data IDAT (S405), may divide a display panel into a plurality of blocks (S410), and may decide a plurality of luminance values (LV) for the plurality of blocks based on the input image data IDAT (S420).

With respect to each outermost block among the plurality of blocks, a first luminance difference calculator 220 may calculate a first difference value DV1 between a luminance value LV of each outermost block and a luminance value LV of an adjacent block adjacent to the outermost block (S430). With respect to each outermost block, a second luminance difference calculator 230 may calculate a second difference value DV2 between the luminance value LV of each outermost block in a first frame and the luminance value LV of the outermost block in a second frame different from the first frame (S440). A fixed image determiner 240 may determine whether a fixed image is displayed in an outermost region based on the first difference value DV1 and the second difference value DV2 of each outermost block (S450).

If the fixed image determiner 240 determines that the fixed image is not displayed in the outermost region (S490), a luminance controller 270 may perform a global luminance control operation (S820). In an embodiment, for example, as illustrated in a first graph 830 of FIG. 20, to perform the global luminance control operation, the luminance controller 270 may gradually decrease a luminance of an outer region according to a distance from a center region CR of the display panel.

If the fixed image determiner 240 determines that the fixed image is displayed in the outermost region (S485), the luminance controller 270 may perform both of the global luminance control operation and an outermost region luminance control operation (S810). In an embodiment, for example, the luminance controller 270 may perform not only the global luminance control operation corresponding to the first graph 830 of FIG. 20, but also the outermost region luminance control operation corresponding to a second graph 840 of FIG. 20. That is, to perform the outermost region luminance control operation, the luminance controller 270 may decrease luminances of first and second adjacent regions AR1 and AR2 with a first luminance decrease rate LDR1, and may decrease luminances of lowermost and uppermost regions LMR and UMR with a second luminance decrease rate LDR2. Since both of the global luminance control operation and the outermost region luminance control operation are performed, as illustrated in a third graph 850 of FIG. 20, the luminances of the first and second adjacent regions AR1 and AR2 and the luminances of the lowermost and uppermost regions LMR and UMR may be further decreased. In an embodiment, for example, a luminance of a bottom of the lowermost region LMR and a luminance of a top of the uppermost region UMR may be decreased with a product of the global luminance decrease rate GLDR and the second luminance decrease rate LDR2. Accordingly, an occurrence of an afterimage (or mura) in the lowermost and uppermost regions LMR and UMR may be further prevented or delayed.

Figure 21:
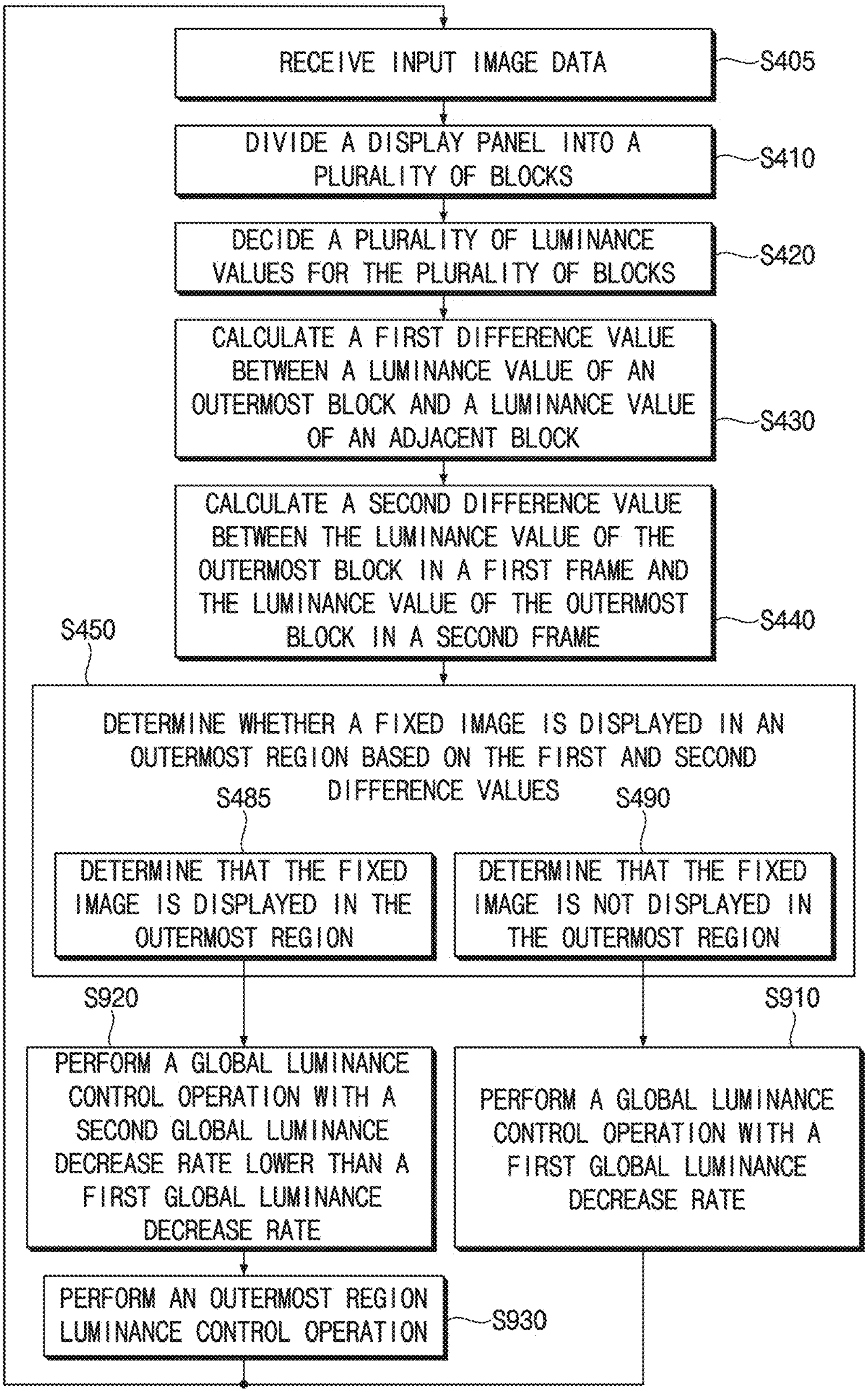
FIG. 21 is a flowchart illustrating a method of controlling a luminance of a display device according to embodiments.
Figure 22:
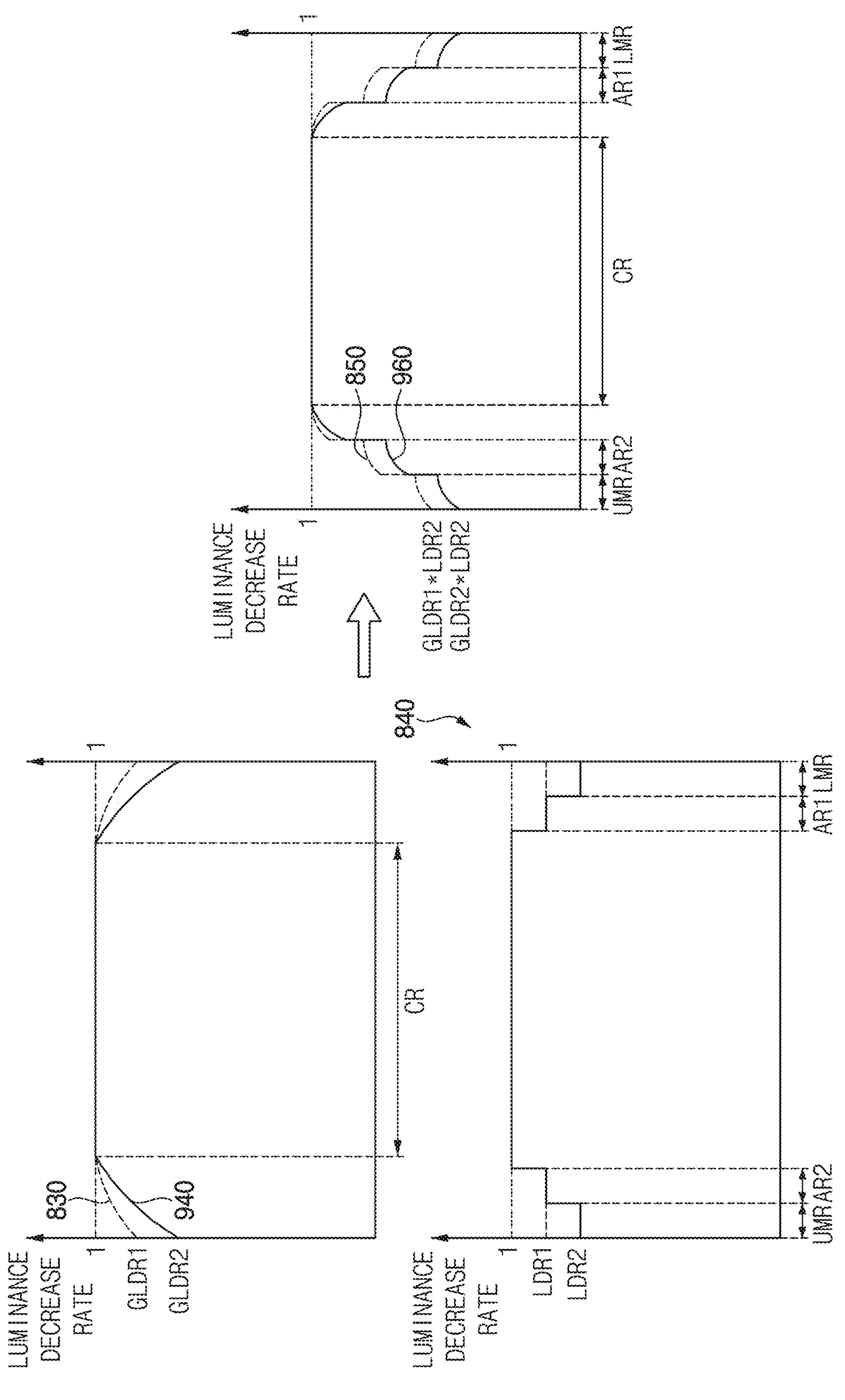
FIG. 22 is a diagram for describing an example of a final luminance decrease rate by a global luminance control operation and an outermost region luminance control operation performed in a luminance control method of FIG. 21.

FIG. 21 is a flowchart illustrating a method of controlling a luminance of a display device according to embodiments, and FIG. 22 is a diagram for describing an example of a final luminance decrease rate by a global luminance control operation and an outermost region luminance control operation performed in a luminance control method of FIG. 21.

A luminance control method of FIG. 21 may be similar to a luminance control method of FIG. 19, except that a global luminance control operation may be performed with a lower global luminance decrease rate when a fixed image is displayed in an outermost region (S920).

Referring to FIGS. 16 and 21, a block luminance decider 210 may receive input image data IDAT (S405), may divide a display panel into a plurality of blocks (S410), and may decide a plurality of luminance values (LV) for the plurality of blocks based on the input image data IDAT (S420).

With respect to each outermost block among the plurality of blocks, a first luminance difference calculator 220 may calculate a first difference value DV1 between a luminance value LV of each outermost block and a luminance value LV of an adjacent block adjacent to the outermost block (S430). With respect to each outermost block, a second luminance difference calculator 230 may calculate a second difference value DV2 between the luminance value LV of each outermost block in a first frame and the luminance value LV of the outermost block in a second frame different from the first frame (S440). A fixed image determiner 240 may determine whether a fixed image is displayed in an outermost region based on the first difference value DV1 and the second difference value DV2 of each outermost block (S450).

If the fixed image determiner 240 determines that the fixed image is not displayed in the outermost region (S490), a luminance controller 270 may perform a global luminance control operation with a first global luminance decrease rate GLDR1 as illustrated in a first graph 830 of FIG. 22 (S910).

Alternatively, if the fixed image determiner 240 determines that the fixed image is displayed in the outermost region (S485), the luminance controller 270 may perform the global luminance control operation with a second global luminance decrease rate GLDR2 lower than the first global luminance decrease rate GLDR1 as illustrated in a second graph 940 of FIG. 22 (S920). Further, the luminance controller 270 may perform not only the global luminance control operation corresponding to the second graph 940 of FIG. 22, but also an outermost region luminance control operation corresponding to a third graph 840 of FIG. 22. Since not only the outermost region luminance control operation, but also the global luminance control operation is performed with the second global luminance decrease rate GLDR2 that is lower than the first global luminance decrease rate GLDR1, compared with a fourth graph 850 of FIG. 22, luminances of first and second adjacent regions AR1 and AR2 and luminances of lowermost and uppermost regions LMR and UMR may be further decreased as illustrated in a fifth graph 960 of FIG. 22. In an embodiment, for example, a luminance of a bottom of the lowermost region LMR and a luminance of a top of the uppermost region UMR may be decreased with a product of the second global luminance decrease rate GLDR2 and a second luminance decrease rate LDR2. Accordingly, an occurrence of an afterimage (or mura) in the lowermost and uppermost regions LMR and UMR may be further prevented or delayed.

Figure 23:
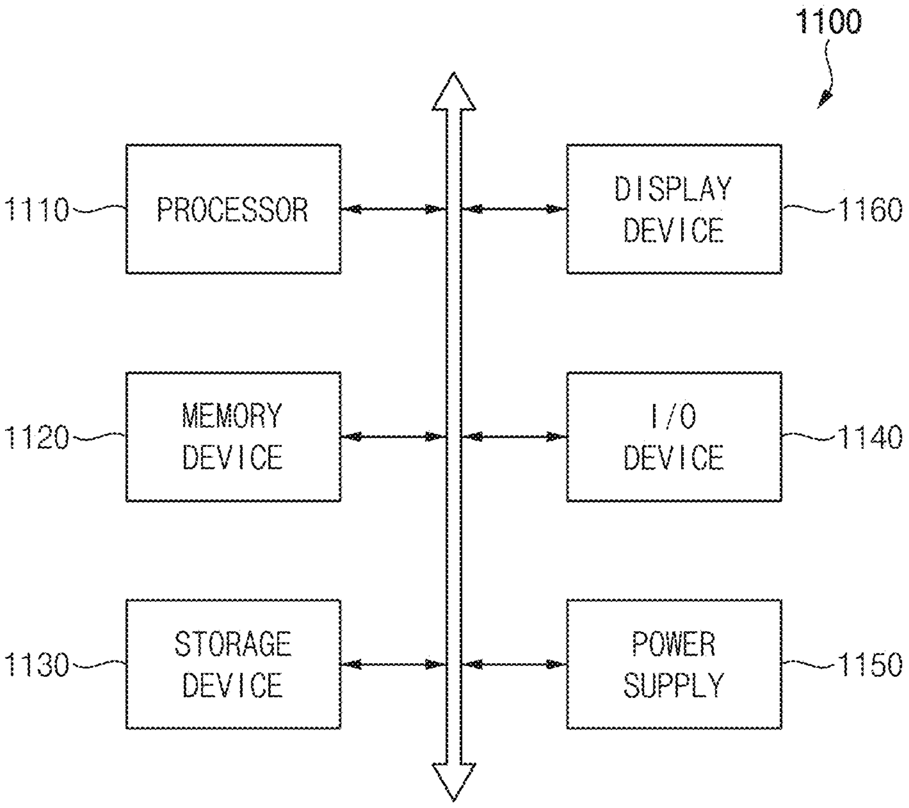
FIG. 23 is a block diagram illustrating an electronic device including a display device according to embodiments.
Figure 24:
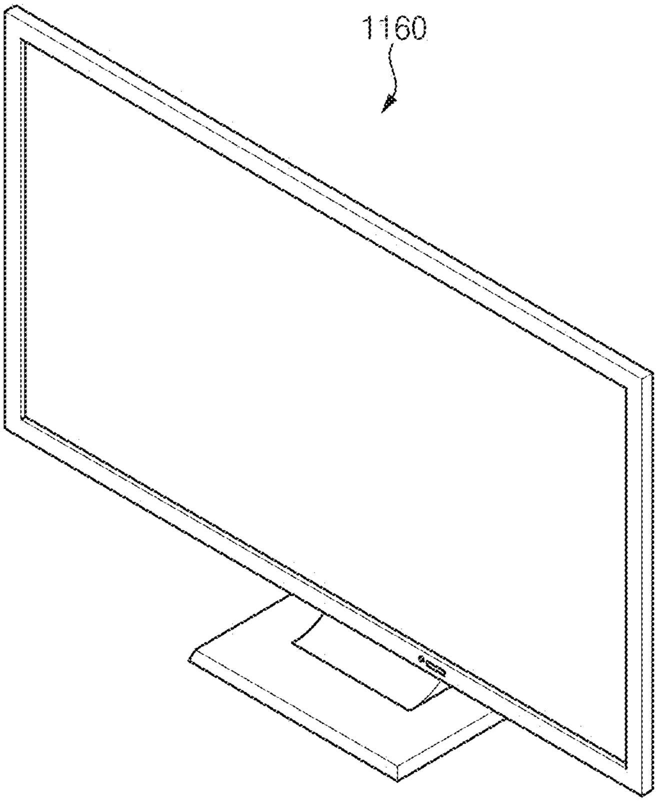
FIG. 24 is a diagram illustrating an example where a display device is implemented as a monitor.

FIG. 23 is a block diagram illustrating an electronic device including a display device according to embodiments, and FIG. 24 is a diagram illustrating an example where a display device is implemented as a monitor.

Referring to FIG. 23, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electronic devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. In an embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

As illustrated in FIG. 24, in a case where the display device 1160 is a monitor, a task bar image may be continuously displayed in an outermost region (e.g., a lowermost region) of a display panel, and a menu image of a specific program (e.g., an office program) may be continuously displayed in the outermost region (e.g., an uppermost region) of the display panel. However, in the display device 1160 according to embodiments, it may be determined whether a fixed image is displayed in the outermost region, and a luminance of the outermost region may be decreased when it is determined that the fixed image is displayed in the outermost region. Accordingly, an occurrence of an after-image (or mura) in the outermost region may be effectively prevented or delayed, and the life of the display device 1160 may be effectively extended.

The inventions may be applied to any electronic device 1100 including the display device 1160. In an embodiment, for example, the inventions may be applied to a mobile phone, a smart phone, a tablet computer, a digital television ("TV"), a 3D TV, a personal computer ("PC"), a home appliance, a laptop computer, a personal digital assistant ("PDA"), a portable multimedia player ("PMP"), a digital camera, a music player, a portable game console, a navigation device, etc.

Figure 25:
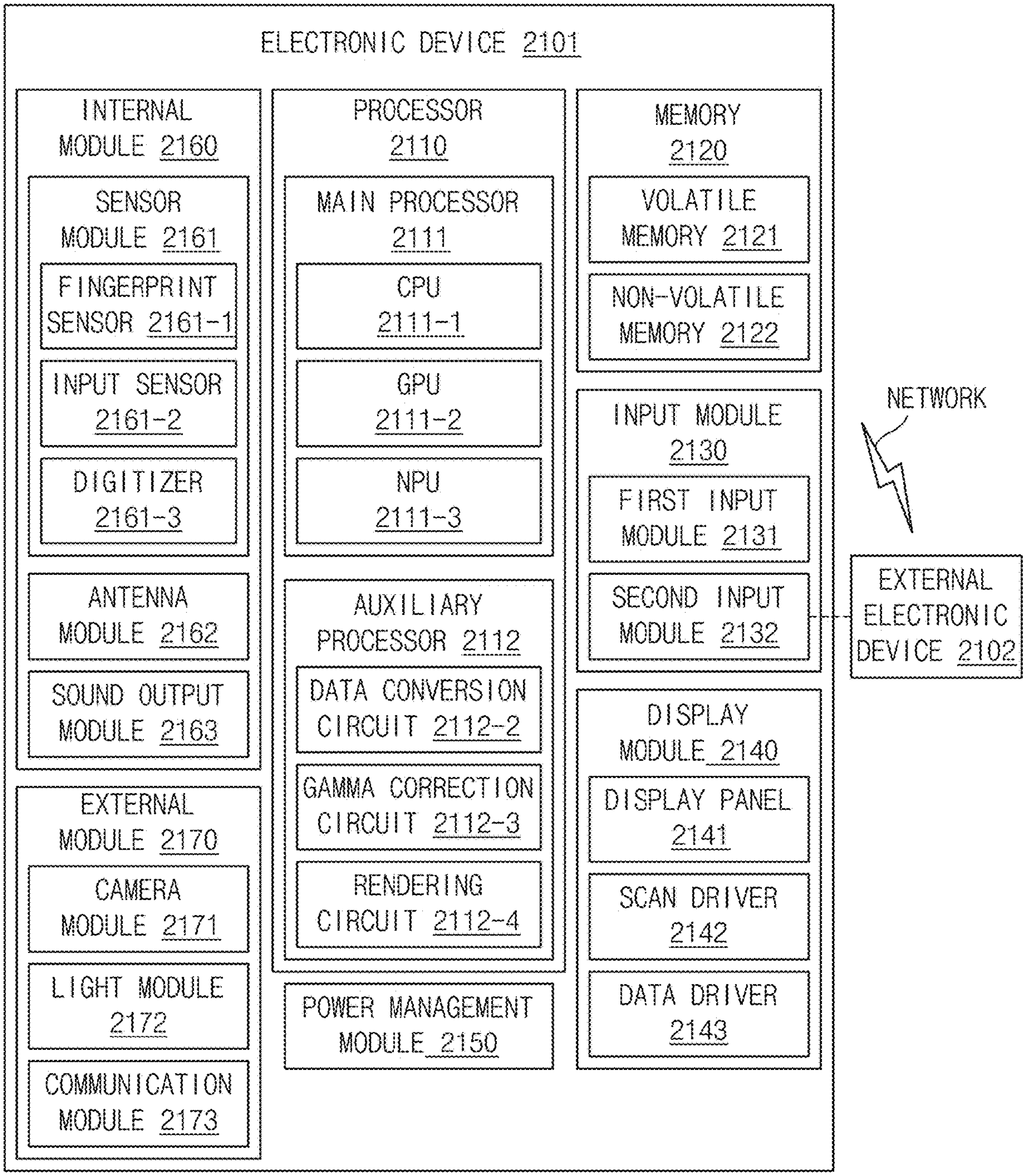
FIG. 25 is a block diagram illustrating an example of an electronic device according to embodiments.

FIG. 25 is a block diagram illustrating an example of an electronic device according to embodiments.

An electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. In an embodiment, for example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As still another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component, or one component may be provided separately as two or more components.

Referring to FIG. 25, the electronic device 2101 may communicate with an external electronic device 2102 via a network (e.g., a short-range wireless communication network or a long-range wireless communication network). In some embodiments, the electronic device 2101 may include the processor 2110, the memory 2120, the input module 2130, the display module 2140, a power management module 2150, an internal module 2160 and an external module 2170. In some embodiments, at least one of the components may be omitted from the electronic device 2101, or one or more other components may be added in the electronic device 2101. In some embodiments, some of the components (e.g., the sensor module 2161, an antenna module 2162, or the sound output module 2163) may be implemented as a single component (e.g., the display module 2140).

The processor 2110 may execute software to control at least one other component (e.g., a hardware or software component) of the electronic device 2101 coupled with the processor 2110, and may perform various data processing or computation. According to some embodiments, as at least part of the data processing or computation, the processor 2110 may store a command or data received from another component (e.g., the input module 2130, the sensor module 2161 or a communication module 2173) in a volatile memory 2121, may process the command or the data stored in the volatile memory 2121, and may store resulting data in a non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP), and an image signal processor ("ISP"). The main processor 2111 may further include a neural processing unit ("NPU") 2111-3. The NPU 2111-3 may be a processor specialized in processing an artificial intelligence model, and the artificial intelligence model may be generated through machine learning. The artificial intelligence model may include a plurality of artificial neural network layers. The artificial neural network may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip), or respective processing units and processors may be implemented as independent components (e.g., a plurality of chips).

The auxiliary processor 2112 may include a controller. The controller included in the auxiliary processor 2112 may correspond to a controller 150 illustrated in FIG. 1. The controller may include an interface conversion circuit and a timing control circuit. The controller may receive an image signal from the main processor 2111, may convert a data format of the image signal to meet interface specifications with the display module 2140, and may output image data. In some embodiments, the controller may further receive a luminance control option signal LCOS illustrated in FIG. 13 from the main processor 2111. In an embodiment, for example, the luminance control option signal LCOS may enable or disable an outermost region luminance control operation for controlling a luminance of an outermost region (e.g., an uppermost region and/or a lowermost region) of the display panel 2141, or may determine a luminance decrease rate used in the outermost region luminance control operation. The controller may output various control signals for driving the display module 2140.

The auxiliary processor 2112 may further include a data conversion circuit 2112-2, a gamma correction circuit 2112-3, a rendering circuit 2112-4, or the like. The data conversion circuit 2112-2 may receive image data from the controller. The data conversion circuit 2112-2 may compensate for the image data such that an image is displayed with a desired luminance according to characteristics of the electronic device 2101 or the user's setting, or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161, or the sound output module 2163) of the electronic device 2101 from the outside of the electronic device 2101 (e.g., the user or the external electronic device 2102).

The input module 2130 may include a first input module 2131 for receiving a command or data from the user, and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In some embodiments, the second input module 2132 may include a high definition multimedia interface ("HDMI"), a universal serial bus ("USB") interface, an SD card interface or an audio interface. The second input module 2132 may include a connector that may physically connect the electronic device 2101 to the external electronic device 2102. In an embodiment, for example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver (or a gate driver) 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is not limited thereto. The display panel 2141 may be a rigid type display panel, or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. In an embodiment, for example, the scan driver 2142 may include an amorphous silicon TFT gate driver circuit ("ASG"), a low temperature polycrystalline silicon ("LTPS") TFT gate driver circuit or an oxide semiconductor TFT gate driver circuit ("OSG") embedded in the display panel 2141. The scan driver 2142 may receive a control signal from the controller and may output scan signals (or gate signals) to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142, or may be integrated into the scan driver 2142.

The data driver 2143 may receive a control signal from the controller, may convert image data into analog voltages (e.g., data voltages) in response to the control signal, and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit, or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable, or a fuel cell. The power management module 2150 may include a power management integrated circuit ("PMIC"). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131, and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen, or may transmit/receive data to/from the active pen.

The input sensor 2161-2 may measure a bio-signal, such as blood pressure, moisture or body fat. In an embodiment, for example, when a portion of the body of the user touches a sensor layer or a sensing panel, and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, or may transmit/receive data to/from the active pen. At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141, or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In some embodiments, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-3 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor or an illuminance sensor.

The antenna module 2162 may include one or more antennas for transmitting or receiving a signal or power to or from the outside. In some embodiments, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In some embodiments, the receiver may be implemented as separate from, or as part of the speaker. A sound output pattern of the sound output module 2163 may be integrated into the display module 2140.

The camera module 2171 may capture a still image and a moving image. In some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171, or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system ("GNSS") communication module) or a wired communication module (e.g., a local area network ("LAN") communication module or a power line communication ("PLC") module). The communication module 2173 may communicate with the external electronic device 2102 via a short-range communication network (e.g., Bluetooth™, wireless-fidelity ("Wi-Fi") direct, or infrared data association ("IrDA")) or a long-range communication network (e.g., a cellular network, the Internet or a computer network (e.g., "LAN" or wide area network ("WAN")). These various types of communication modules 2173 may be implemented as a single chip, or may be implemented as multi-chips separate from each other.

The input module 2130, the sensor module 2161, the camera module 2171, and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. In an embodiment, for example, the processor 2110 may generate image data corresponding to input data applied through a mouse or an active pen, and may output the image data to the display module 2140. Alternatively, the processor 2110 may generate command data corresponding to the input data, and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. In an embodiment, for example, the processor 2110 may compare authentication data applied by the fingerprint sensor 2161-1 with authentication data stored in the memory 2120, and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161, and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. In an embodiment, for example, after the processor 2110 determines the presence or absence of the user based on the input from the camera module 2171, the data conversion circuit 2112-2 or the gamma correction circuit 2112-3 may perform the luminance correction on the image data, and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), mobile industry processor interface ("MIPI") or ultra-path interconnect ("UPI")). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. In an embodiment, for example, the electronic device 2101 may include at least one of a TV, a digital TV, a 3D TV, a mobile phone, a smart phone, a tablet computer, a personal computer (PC), a home appliance, a laptop computer, a personal digital assistant (PDA), a portable multimedia player (PMP), a digital camera, a music player, a portable game console, a navigation device, etc.

As used in connection with various embodiments of the disclosure, each of the block luminance decider 210, the first luminance difference calculator 220, the second luminance difference calculator 230, the fixed image determiner 240 and the luminance controller 250 to 270 may be implemented in hardware, software, or firmware, for example, implemented in a form of an application-specific integrated circuit (ASIC).

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels; and a panel driver configured to:

drive the display panel based on input image data, determine whether a fixed image is displayed in an outermost region of the display panel based on the input image data, and decrease a luminance of the outermost region based on determination that the fixed image is displayed in the outermost region.

2. The display device of claim 1, wherein the outermost region includes at least one of a lowermost region and an uppermost region of the display panel.

3. The display device of claim 1, wherein the fixed image includes at least one of a task bar image and a menu image.

4. The display device of claim 1, wherein the panel driver determines that the fixed image is displayed in the outermost region when a difference between the luminance of the outermost region and a luminance of an adjacent region adjacent to the outermost region is greater than or equal to a first reference difference, and a difference between the luminance of the outermost region in a first frame and the luminance of the outermost region in a second frame different from the first frame is less than or equal to a second reference difference.

5. The display device of claim 1, wherein the panel driver includes:

a block luminance decider configured to divide the display panel into a plurality of blocks, and to decide a plurality of luminance values for the plurality of blocks, respectively, based on the input image data;

a first luminance difference calculator configured to calculate, with respect to each of outermost blocks located in the outermost region among the plurality of blocks, a first difference value between a luminance value of each of the outermost blocks and a luminance value of an adjacent block adjacent to each of the outermost blocks;

a second luminance difference calculator configured to calculate, with respect to each of the outermost blocks, a second difference value between the luminance value of each of the outermost blocks in a first frame and the luminance value of each of the outermost blocks in a second frame different from the first frame; and a fixed image determiner configured to determine whether the fixed image is displayed in the outermost region based on the first difference value and the second difference value of each of the outermost blocks.

6. The display device of claim 5, wherein the block luminance decider converts a plurality of gray levels represented by the input image data for the plurality of pixels included in each of the plurality of blocks into a plurality of pixel luminance values, and decides an average of the plurality of pixel luminance values of each of the plurality of blocks as the luminance value of each of the plurality of blocks.

7. The display device of claim 5, wherein the outermost blocks are arranged continuously along a first direction, and wherein the adjacent block is adjacent to each of the outermost blocks in a second direction substantially perpendicular to the first direction.

8. The display device of claim 5, wherein the first frame is a current frame, and wherein the second frame is an immediately previous frame.

9. The display device of claim 5, wherein the first frame is a current frame, and wherein the second frame is a previous frame apart from the current frame by an interval of at least one frame therebetween.

10. The display device of claim 5, wherein the fixed image determiner determines that the fixed image is displayed in the outermost region when the first difference value is greater than or equal to a first reference difference value, and a total number of the outermost blocks of which the second difference value is less than or equal to a second reference difference value is greater than or equal to a reference number.

11. The display device of claim 5, wherein the fixed image determiner increases, in each frame, a step value of each of the outermost blocks of which the first difference value is greater than or equal to a first reference difference value and the second difference value is less than or equal to a second reference difference value, decreases, in each frame, the step value of each of the outermost blocks of which the first difference value is less than the first reference difference value or the second difference value is greater than the second reference difference value, counts a total number of the outermost blocks of which the step value is a maximum step value, and determines that the fixed image is displayed in the outermost region when the counted total number is greater than or equal to a reference number.

12. The display device of claim 1, wherein the panel driver includes:

a luminance controller configured to decrease the luminance of the outermost region based on determination that the fixed image is displayed in the outermost region.

13. The display device of claim 12, wherein the luminance controller gradually decreases a luminance of an adjacent region adjacent to the outermost region and the luminance of the outermost region.

14. The display device of claim 12, wherein the luminance controller decreases a luminance of an adjacent region adjacent to the outermost region with a first luminance decrease rate, and decreases the luminance of the outermost region with a second luminance decrease rate lower than the first luminance decrease rate.

15. The display device of claim 12, wherein the luminance controller receives a luminance control option signal representing a first luminance decrease rate and a second luminance decrease rate from an external host processor, decreases a luminance of an adjacent region adjacent to the outermost region with the first luminance decrease rate, and decreases the luminance of the outermost region with the second luminance decrease rate.

16. The display device of claim 1, wherein the panel driver includes:

a luminance controller configured to perform a global luminance control operation to control a luminance of an entire region of the display panel, and to perform an outermost region luminance control operation to decrease the luminance of the outermost region displaying the fixed image.

17. The display device of claim 16, wherein, to perform the global luminance control operation, the luminance controller gradually decreases luminances of the plurality of pixels according to a distance from a center region of the display panel to each of the plurality of pixels.

18. The display device of claim 16, wherein, with respect to each of the plurality of pixels in the outermost region, the luminance controller calculates a final luminance decrease rate by multiplying a global luminance decrease rate for the global luminance control operation and a luminance decrease rate for the outermost region luminance control operation, and decreases a luminance of each of the plurality of pixels in the outermost region with the final luminance decrease rate.

19. The display device of claim 16, wherein, based on determination that the fixed image is not displayed in the outermost region, the luminance controller performs the global luminance control operation with a first global luminance decrease rate, and wherein, based on determination that the fixed image is displayed in the outermost region, the luminance controller performs the global luminance control operation with a second global luminance decrease rate lower than the first global luminance decrease rate, and further performs the outermost region luminance control operation.

20. A display device comprising:

a display panel including a plurality of pixels; and a panel driver configured to drive the display panel based on input image data, the panel driver including:

a block luminance decider configured to divide the display panel into a plurality of blocks, and to decide a plurality of luminance values for the plurality of blocks, respectively, based on the input image data;

a first luminance difference calculator configured to calculate, with respect to each of outermost blocks located in an outermost region of the display panel among the plurality of blocks, a first difference value between a luminance value of each of the outermost blocks and a luminance value of an adjacent block adjacent to each of the outermost blocks;

a second luminance difference calculator configured to calculate, with respect to each of the outermost blocks, a second difference value between the luminance value of each of the outermost blocks in a first frame and the luminance value of each of the outermost blocks in a second frame different from the first frame;

a fixed image determiner configured to determine whether a fixed image is displayed in the outermost region based on the first difference value and the second difference value of each of the outermost blocks; and a luminance controller configured to decrease a luminance of the outermost region based on determination that the fixed image is displayed in the outermost region.

21. The display device of claim 20, wherein the luminance controller performs a global luminance control operation that controls a luminance of an entire region of the display panel along with an outermost region luminance control operation that decreases the luminance of the outermost region displaying the fixed image.

22. A method of controlling a luminance of a display device, the method comprising:

dividing a display panel of the display device into a plurality of blocks;

deciding a plurality of luminance values for the plurality of blocks, respectively, based on input image data;

calculating, with respect to each of outermost blocks located in an outermost region of the display panel among the plurality of blocks, a first difference value between a luminance value of each of the outermost blocks and a luminance value of an adjacent block adjacent to each of the outermost blocks;

calculating, with respect to each of the outermost blocks, a second difference value between the luminance value of each of the outermost blocks in a first frame and the luminance value of each of the outermost blocks in a second frame different from the first frame;

determining whether a fixed image is displayed in the outermost region based on the first difference value and the second difference value of each of the outermost blocks; and decreasing a luminance of the outermost region based on determining that the fixed image is displayed in the outermost region.

23. The method of claim 22, further comprising:

receiving a luminance control option signal representing a first luminance decrease rate and a second luminance decrease rate from an external host processor, wherein decreasing the luminance of the outermost region includes:

decreasing a luminance of an adjacent region adjacent to the outermost region with the first luminance decrease rate; and decreasing the luminance of the outermost region with the second luminance decrease rate.

24. The method of claim 22, further comprising:

performing a global luminance control operation to control a luminance of an entire region of the display panel.

25. The method of claim 24, wherein performing the global luminance control operation includes:

performing the global luminance control operation with a first global luminance decrease rate based on determination that the fixed image is not displayed in the outermost region; and performs the global luminance control operation with a second global luminance decrease rate lower than the first global luminance decrease rate based on determination that the fixed image is displayed in the outermost region.

26. A display device comprising:

a display panel including a plurality of pixels; and a panel driver configured to drive the display panel based on input image data, wherein, with respect to a same gray level of the input image data, the panel driver sets a luminance of an outermost image of the display panel when a task bar image is displayed in an outermost region lower than the luminance of the outermost image when the task bar image is not displayed in the outermost region.

27. An electronic device comprising:

a processor configured to provide image data;

a display panel including a plurality of pixels;

a data driver configured to provide data voltages to the plurality of pixels;

a gate driver configured to provide gate signals to the plurality of pixels; and a controller configured to receive the image data from the processor, and to control the data driver and the gate driver, the controller further configured to:

determine whether a fixed image is displayed in an outermost region of the display panel based on the image data; and decrease a luminance of the outermost region based on determination that the fixed image is displayed in the outermost region.

28. The electronic device of claim 27, wherein the controller determines that the fixed image is displayed in the outermost region when a difference between the luminance of the outermost region and a luminance of an adjacent region adjacent to the outermost region is greater than or equal to a first reference difference, and a difference between the luminance of the outermost region in a first frame and the luminance of the outermost region in a second frame different from the first frame is less than or equal to a second reference difference.

29. The electronic device of claim 27, wherein the controller includes:

a block luminance decider configured to divide the display panel into a plurality of blocks, and to decide a plurality of luminance values for the plurality of blocks, respectively, based on the image data;

a first luminance difference calculator configured to calculate, with respect to each of outermost blocks located in the outermost region among the plurality of blocks, a first difference value between a luminance value of each of the outermost blocks and a luminance value of an adjacent block adjacent to each of the outermost blocks;

a second luminance difference calculator configured to calculate, with respect to each of the outermost blocks, a second difference value between the luminance value of each of the outermost blocks in a first frame and the luminance value of each of the outermost blocks in a second frame different from the first frame;

a fixed image determiner configured to determine whether the fixed image is displayed in the outermost region based on the first difference value and the second difference value of each of the outermost blocks; and a luminance controller configured to decrease the luminance of the outermost region based on determination that the fixed image is displayed in the outermost region.

30. The electronic device of claim 29, wherein the controller receives a luminance control option signal representing a first luminance decrease rate and a second luminance decrease rate from the processor, and wherein the luminance controller decreases a luminance of an adjacent region adjacent to the outermost region with the first luminance decrease rate, and decreases the luminance of the outermost region with the second luminance decrease rate.

31. The electronic device of claim 29, wherein the luminance controller performs a global luminance control operation that controls a luminance of an entire region of the display panel along with an outermost region luminance control operation that decreases the luminance of the outermost region displaying the fixed image.

* * * * *